(12) United States Patent
Dropps

(10) Patent No.: US 9,767,318 B1
(45) Date of Patent: Sep. 19, 2017

(54) SECURE CONTROLLER SYSTEMS AND ASSOCIATED METHODS THEREOF

(71) Applicant: Frank Dropps, Maple Grove, MN (US)

(72) Inventor: Frank Dropps, Maple Grove, MN (US)

(*) Notice: Subject to any disclaimer, the term of this patent is extended or adjusted under 35 U.S.C. 154(b) by 48 days.

(21) Appl. No.: 14/839,525

(22) Filed: Aug. 28, 2015

(51) Int. Cl.
| | | |
|---|---|---|
| *G06F 21/00* | (2013.01) | |
| *G06F 21/72* | (2013.01) | |
| *G06F 9/445* | (2006.01) | |
| *G06F 21/44* | (2013.01) | |

(52) U.S. Cl.
CPC .............. *G06F 21/72* (2013.01); *G06F 8/65* (2013.01); *G06F 21/44* (2013.01)

(58) Field of Classification Search
CPC ............ G06F 21/72; G06F 21/44; G06F 8/65
See application file for complete search history.

(56) References Cited

U.S. PATENT DOCUMENTS

| | | | | | |
|---|---|---|---|---|---|
| 6,052,797 | A * | 4/2000 | Ofek | ................... | G06F 11/2064 709/219 |
| 6,119,228 | A * | 9/2000 | Angelo | ................... | H04L 41/28 380/255 |
| 6,212,635 | B1 * | 4/2001 | Reardon | ................. | G06F 21/34 380/30 |
| 6,546,492 | B1 * | 4/2003 | Walker | ..................... | G06F 8/65 726/3 |
| 6,598,165 | B1 * | 7/2003 | Galasso | ................. | G06F 21/79 713/156 |
| 6,986,042 | B2 * | 1/2006 | Griffin | .................... | G06F 21/53 711/162 |
| 7,085,815 | B2 * | 8/2006 | Dixon | ..................... | H04L 29/06 707/999.008 |
| 7,689,209 | B1 * | 3/2010 | Spitz | ................. | H04M 3/42178 370/331 |
| 8,014,767 | B1 * | 9/2011 | Spitz | ..................... | H04W 24/08 455/419 |
| 8,127,346 | B2 * | 2/2012 | Kulakowski | ............ | G06F 21/31 726/10 |
| 8,667,273 | B1 * | 3/2014 | Billstrom | ............ | G06F 21/6209 713/165 |
| 8,745,612 | B1 * | 6/2014 | Semenzato | ............... | G06F 8/65 717/170 |
| 9,020,895 | B1 * | 4/2015 | Rajashekar | ....... | G06F 17/30088 707/639 |
| 9,141,382 | B2 * | 9/2015 | Heyhoe | ..................... | G06F 8/71 |
| 9,405,920 | B1 * | 8/2016 | Roth | ..................... | G06F 21/602 |

(Continued)

*Primary Examiner* — David García Cervetti
(74) *Attorney, Agent, or Firm* — Klein, O'Neill & Singh, LLP

(57) ABSTRACT

Systems and methods for encrypted processing are provided. For example, an apparatus for encrypted processing includes: an input interface adapted to receive input from a device; an encrypted processor connected to the input interface; a program store control connected to the encrypted processor, the program store control controlling use of and access to at least two program stores, where at least one program store acts as a primary program store and at least one program store acts as a back-up program store; and an output interface connected to the encrypted processor for outputting at least one of commands or data; where the encrypted processor is programmed to: receive and validate a request; determine whether a valid request is a program update request for a first program; and initiate a lock mechanism into a locked state.

20 Claims, 10 Drawing Sheets

(56) References Cited

U.S. PATENT DOCUMENTS

| | | | |
|---|---|---|---|
| 2002/0087668 A1* | 7/2002 | San Martin | G06F 8/65 709/221 |
| 2002/0099948 A1* | 7/2002 | Kocher | G06Q 20/367 713/194 |
| 2002/0188763 A1* | 12/2002 | Griffin | G06F 21/53 719/310 |
| 2003/0079132 A1* | 4/2003 | Bryant | G06F 8/60 713/182 |
| 2003/0084275 A1* | 5/2003 | David | G06F 9/4416 713/1 |
| 2003/0126442 A1* | 7/2003 | Glew | G06F 21/52 713/170 |
| 2003/0140288 A1* | 7/2003 | Loaiza | G06F 11/0727 714/718 |
| 2003/0231103 A1* | 12/2003 | Fisher | G07C 9/00103 340/5.73 |
| 2004/0003266 A1* | 1/2004 | Moshir | G06F 8/65 713/191 |
| 2004/0031030 A1* | 2/2004 | Kidder | G06F 1/14 717/172 |
| 2004/0044703 A1* | 3/2004 | Wildhagen | G06F 8/67 |
| 2004/0103340 A1* | 5/2004 | Sundareson | G06F 11/1433 714/6.3 |
| 2004/0215772 A1* | 10/2004 | Dinker | H04L 29/06 709/225 |
| 2005/0021968 A1* | 1/2005 | Zimmer | G06F 21/572 713/176 |
| 2005/0131990 A1* | 6/2005 | Jewell | G06F 11/1464 709/201 |
| 2006/0015584 A1* | 1/2006 | Ocko | H04L 69/40 709/219 |
| 2006/0015641 A1* | 1/2006 | Ocko | G06F 11/1662 709/236 |
| 2006/0056285 A1* | 3/2006 | Krajewski | G05B 9/03 370/216 |
| 2006/0080656 A1* | 4/2006 | Cain | G06F 8/65 717/174 |
| 2006/0143530 A1* | 6/2006 | Largman | G06F 11/1417 714/36 |
| 2006/0143600 A1* | 6/2006 | Cottrell | G06F 21/572 717/168 |
| 2006/0293030 A1* | 12/2006 | Cantini | G06Q 20/32 455/411 |
| 2007/0179896 A1* | 8/2007 | Elteto | G06F 21/10 705/57 |
| 2009/0113152 A1* | 4/2009 | Eguchi | G06F 11/1451 711/162 |
| 2009/0125692 A1* | 5/2009 | Yamamoto | G06F 11/1451 711/162 |
| 2009/0164994 A1* | 6/2009 | Vasilevsky | G06F 9/45533 718/1 |
| 2009/0217163 A1* | 8/2009 | Jaroker | G06F 8/60 715/700 |
| 2009/0276620 A1* | 11/2009 | McCarron | H04L 9/3271 713/155 |
| 2010/0235882 A1* | 9/2010 | Moore | G06Q 20/06 726/3 |
| 2010/0241848 A1* | 9/2010 | Smith | G01D 4/004 713/153 |
| 2010/0251206 A1* | 9/2010 | Horiuchi | G06F 17/30168 717/103 |
| 2010/0293147 A1* | 11/2010 | Snow | G06F 17/30067 707/640 |
| 2010/0318837 A1* | 12/2010 | Murphy | G06F 11/1461 714/4.1 |
| 2011/0010701 A1* | 1/2011 | Cooper | G06F 21/12 717/175 |
| 2011/0296205 A1* | 12/2011 | Henry | G06F 12/0875 713/190 |
| 2011/0321023 A1* | 12/2011 | Hocker | G06F 8/67 717/168 |
| 2012/0072734 A1* | 3/2012 | Wishman | G06F 21/572 713/189 |
| 2012/0110308 A1* | 5/2012 | Chen | G06F 11/3072 712/220 |
| 2012/0124567 A1* | 5/2012 | Landry | G06F 8/665 717/168 |
| 2013/0024933 A1* | 1/2013 | Jakobsson | G06F 21/567 726/22 |
| 2013/0024936 A1* | 1/2013 | Jakobsson | G06F 21/554 726/23 |
| 2013/0117359 A1* | 5/2013 | Husain | G06F 9/445 709/203 |
| 2013/0132939 A1* | 5/2013 | Murata | H02J 7/041 717/173 |
| 2013/0179871 A1* | 7/2013 | Nagao | G06F 8/65 717/170 |
| 2013/0212556 A1* | 8/2013 | Heyhoe | G06F 8/71 717/106 |
| 2013/0227543 A1* | 8/2013 | Chen | G06F 8/65 717/173 |
| 2013/0326358 A1* | 12/2013 | Scarborough | H04L 47/70 715/741 |
| 2014/0075015 A1* | 3/2014 | Chan | H04L 41/046 709/224 |
| 2014/0113592 A1* | 4/2014 | Wu | G06F 21/44 455/411 |
| 2014/0148246 A1* | 5/2014 | Quan | A63F 13/10 463/24 |
| 2014/0229729 A1* | 8/2014 | Roth | H04L 63/0471 713/153 |
| 2015/0113520 A1* | 4/2015 | Kotani | G06F 8/65 717/172 |
| 2015/0199190 A1* | 7/2015 | Spangler | G06F 8/665 713/2 |
| 2015/0254069 A1* | 9/2015 | Ito | G06F 13/00 717/174 |
| 2015/0378942 A1* | 12/2015 | Bradbury | G06F 13/24 710/267 |
| 2016/0036814 A1* | 2/2016 | Conrad | H04L 63/0876 713/171 |
| 2016/0063255 A1* | 3/2016 | Jeansonne | G06F 9/4401 713/2 |
| 2016/0085558 A1* | 3/2016 | Anbazhagan | G06F 8/665 713/2 |
| 2016/0337321 A1* | 11/2016 | Lin | H04L 63/0428 |
| 2016/0359823 A1* | 12/2016 | Ayyadevara | H04L 63/061 |
| 2016/0362084 A1* | 12/2016 | Martin | B60R 25/00 |
| 2017/0005803 A1* | 1/2017 | Brownewell | H04L 9/3247 |

* cited by examiner

SECURE CONTROLLER SYSTEMS AND ASSOCIATED METHODS THEREOF

BACKGROUND

Technical Field

The aspects disclosed herein relate to security for computing devices and related methods thereof.

Related Art

Conventional networked computer systems and real-time control systems are vulnerable to unauthorized access as they use networked programmable logic controllers, unlike relay control systems in the past that were physically isolated but were inefficient and required more maintenance. Unauthorized users today are able to load programmable instructions including software and access stored data. The vulnerability of a computer system can have significant consequences in commercial applications.

The unauthorized access and installation of unauthorized software is a significant issue for government organizations, utilities, financial, retail, healthcare, aerospace, automotive, technology, and other companies. Computer systems today are under constant attack from many different methods. It is possible for cyber terrorist or criminals to attack a nation's infrastructure and cause significant damage which may result in loss of life, intellectual property, classified information and others. For example, cyber-attacks on natural gas line transmission systems could disrupt gas delivery during cold weather causing billions in damage from frozen water pipes and loss of life from exposure. Similarly, disruption of an electrical grid due to cyber-attack may have similar effect. A sever attack could cause a pipeline rupture within a populated area resulting in significant loss of life. Cyber terrorists may also attack voting machines, building control, automatic teller machines, transportation systems including trains, subway system, commercial aircraft, drone aircraft, trucks, busses, automobiles and autonomous vehicles that may result in government destabilization, significant loss of property and life.

In conventional security systems, network traffic patterns are monitored to detect data security breaches. These are easily missed and may only be detected after a breach has occurred and sometimes these warnings are even ignored, for example, in much publicized credit card data breach cases. Continuous efforts are being made to improve cyber security in general and security for computing devices in particular.

BRIEF DESCRIPTION OF THE DRAWINGS

The various present aspects now will be discussed in detail with an emphasis on highlighting the advantageous features. These aspects depict the novel and non-obvious systems and methods for network devices shown in the accompanying drawings, which are for illustrative purposes only. The figures are not intended to depict scale. These drawings include the following figures, in which like numerals indicate like parts.

DETAILED DESCRIPTION

Figure 1:
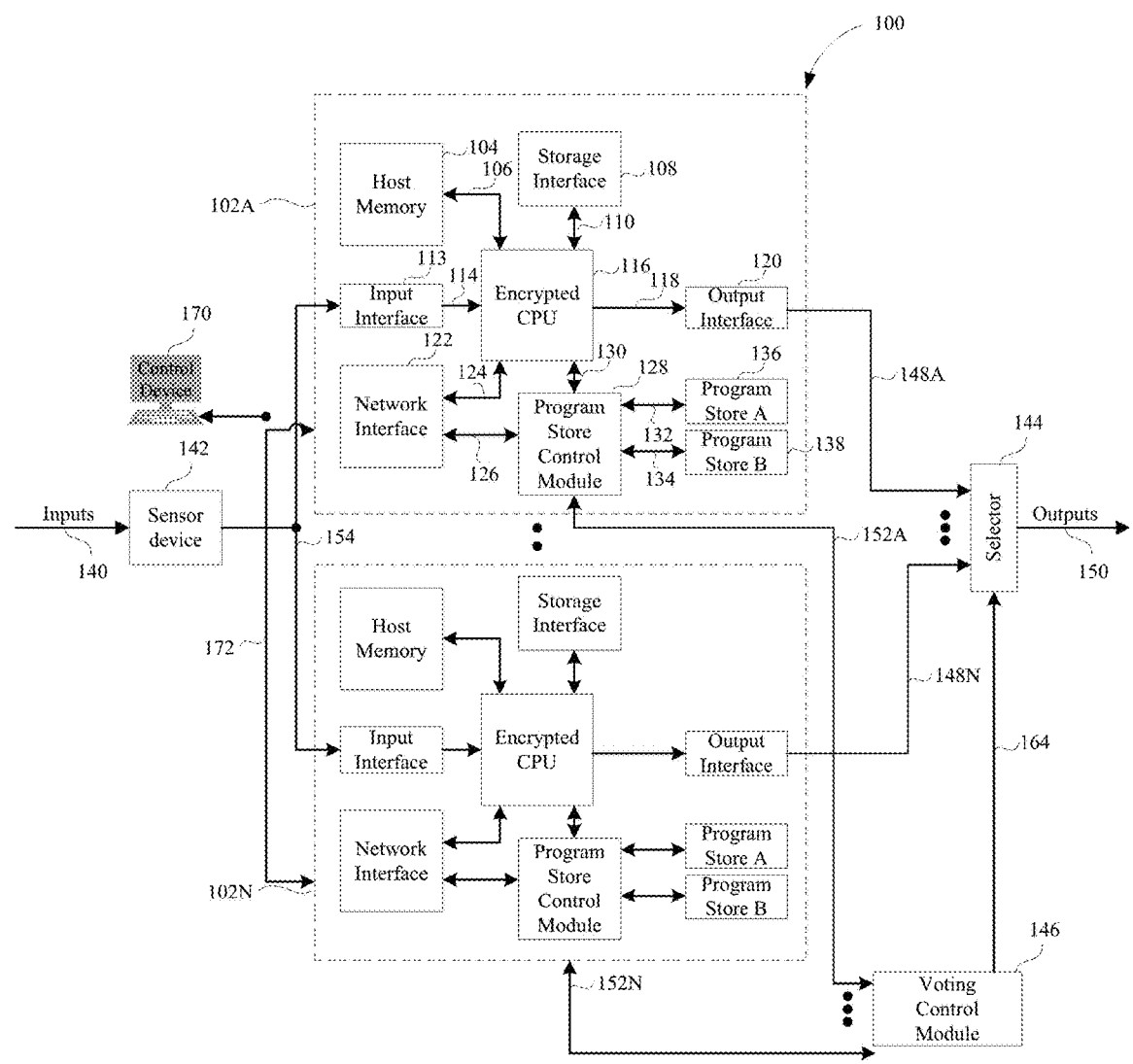
FIG. 1 is a block diagram of an apparatus of a secure controller, according to one aspect of the present disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications described in the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as High Performance Parallel Interface (HIPPI), Small Computer System Interface (SCSI), Internet Protocol (IP), Asynchronous Transfer Mode (ATM) and others. Fibre Channel provides an input/output interface to meet the requirements of both channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the cloud computing environments. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Aspects are directed to an apparatus that comprises hardware cryptographic processing to protect real-time control systems. Aspects address the security of programmable logic controllers, computer controllers and computer systems used for real-time infrastructure control, autonomous vehicles, autonomous drones, aircraft, automobiles, the Internet-of-Things and other applications. Aspects describe concepts for achieving resiliency against cyber-attacks on cyber physical systems controlling the nation's factories and infrastructure i.e. oil pipeline transmission, natural gas pipeline transmission, electrical generation, electrical grid and water treatment.

Various aspects described herein include cyber-attack resilient redundancy and methods to identify when one of redundant programmable devices has been compromised. A compromised device is automatically disabled preventing a breach from expanding through a system. The level of redundancy is flexible to support a variety of applications. Some computing system components use more redundancy, but for cost considerations redundancy may optimized.

The adaptive aspects disclosed involve redundancy and hardware cryptography to reconfigure data, memory addressing and an instruction set architecture of a protected computer system (may also be referred to as computing device throughout this specification). In one aspect, a protected platform hardware can be identical between a plurality of computing systems but, because each system may be booted using a unique private cryptographic key set, execution of program instructions for each system is unique. Any software program for a protected target computer system is processed using a translator program or special compilers using a same private cryptographic key set that was used to boot the protected target computer system including an operating system.

In one aspect, a cryptographic key set is used to execute interruptive software programming languages (i.e. a program interpreter) such as Java and just-in-time computation, also known as dynamic translation, such as Smalltalk. The program interrupter and just-in-time compilers are modified to use a cryptographic key set. As described below in detail, these unique hardware qualities and software build architecture protects technologies by forcing an attacker (i.e. an unauthorized user of a computing system) to decipher transformed characteristics on each system, averting proliferation issues due to unique cryptographic protection of each system, and creating a significant barrier to attacking system components. The cryptographic key set can be changed on a periodic bases for added protection. In another aspect, different cryptographic algorithms or applications algorithm are selected at computing system boot time to improve system protection from unauthorized access.

Certain aspects of the present disclosure are associated with cryptographic performance, cryptographic architectural positioning, cryptographic key sets, cryptographic key protection, and unique virtual image cryptographic keys, as described below in detail.

Some aspects described herein describe technology to efficiently perform cryptographic processing at high data rates with low latency. The cryptographic processing may have a significant impact on computer system performance. Aspects herein describe systems and methods of cryptographic processing that help to reduce performance impact of decryption of instructions, addresses, and data.

In one aspect, cryptographic processing maybe positioned around a central processing unit (CPU) of a system to prevent unauthorized programs from executing. In a further aspect, cryptographic processing is positioned inside one or more instructions and data caches to prevent non-cryptographically protected programs from running completely or partly within a cache of a computing system.

In one aspect, a plurality of unique cryptographic key sets are preferably utilized because software program execution patterns can expose cryptographic keys to reverse engineering. This reverse engineering maybe easier on smaller fields where unprotected information has limited variability like instruction set fields. Aspects described herein use a separate cryptographic key set for each processor instruction address, processor instruction set, data address, program data, network addresses, network data, storage address, storage data and others. An unauthorized user would be required to decipher a plurality of cryptographic keys to execute virus malware programs because such a user would need access to each of the elements described herein.

In one aspect, because of the importance of the cryptographic keys to program execution and to reduce single points of failure, as described below in detail, a majority voting circuit may be used for cryptographic key storage. This voting circuit may include a correction method to correct bad copies of the cryptographic key sets so errors do not propagate among other components.

In one aspect, a unique cryptographic key set is used for each virtual image in a virtual machine environment. In a virtualized computer system (or virtual machine), each user context uses a unique cryptographic key set. These cryptographic key sets are also different from the cryptographic key set used by a kernel operating system of a computing system that presents the virtual machines.

In one aspect, a cryptographic key set and cryptographic algorithms/processes are provided. A strong cryptographic key and algorithm are used as weak cryptographic methods may compromise a protected computer system. Some aspects of computer system program execution patterns are predictable and may expose the cryptographic keys to deciphering. Thus, cryptographic key sets are used to increase the protection strength. The cryptographic performance may have a significant impact on the computer system performance. The software modification described herein as provided in aspects of the disclosure includes changes to the operating system and other software programs. The software modification includes encrypting program instructions, program data and memory addresses using the cryptographic key sets to match the decryption that will occur within the protected computer system.

In one aspect, a protected computer system may use a combination of redundancy and hardware cryptography. The number of redundant copies may vary from 1 to n. Compromised device detection is a significant challenge in a real-time control environment as inputs are not fixed values. Each processor will receive slightly different sensor values resulting in different controller outputs. If an output value voting mechanism is used, then some amount of uncertainty or delta needs to be allowed.

There are numerous types of cyber-attack induced failures. Because of the proximity to humans and their ability to detect abrupt changes caused by Byzantine failures, this type of cyber-attack induced failure would not be the most destructive. One example of a cyber-attack on a control system was the "Stuxnet" virus that was used against centrifuges in Iran. The Stuxnet virus slowly changed the parameters of operation without being detected to eventually cause the centrifuges to operate outside of normal operating parameters and tear themselves apart. Many in the industry believe that a Stuxnet type approach is a more dangerous cyber-attack because of the difficulty of detection. In one aspect, a real-time output delta can be used to defeat standard results output voting detection mechanism described below. An aspect uses a combination of redundancy with cyber-attack detection and cryptographic protection to provide an improved secured computer system.

In one aspect, cryptographic protection around a central processing unit uses a private set of modified one-time pad (OTP) cryptographic keys. In cryptography, OTP is a cryptographic processing technique that is difficult to crack if used correctly. In this technique, information is paired with a random secret key (or pad). Then, each bit or character of the information is cryptographically protected by combining it with the corresponding bit or character from the pad using modular addition. If the key is truly random, is at least as long as the information sequence, is never reused in whole or in part, and is kept completely secret, then the resulting cipher or secured information is difficult to decrypt or break. It has also been proven that any cipher with secrecy property use keys with effectively the same requirements as one-time pads keys will have similar protection properties. The modified one-time pad cryptography may repeat the use of the extremely long key. It may be repeated if the information is larger than the cryptographic key or when the same key index, address, function or command is used. These modifications to the OTP cryptographic algorithm may be made for practical implementation purposes. If the modified OTP is very large its protection will approach that of the non-modified OTP cryptographic algorithm.

A cryptographic algorithm and the application of the cryptographic keys to instruction addresses, program instructions, data addresses, program data, network addresses, network data packets, storage address, storage data packets and other information to be protected provides greater security. Application to some of the program data could be straight forward without using a cryptographic key mask and using a data address to index a modified OTP cryptographic key. A cryptographic key mask is used to control the application of a cryptographic key to encrypt or decrypt information. For example if a bit in a cryptographic key mask is one, a cryptographic algorithm would apply the corresponding cryptographic key bit to the corresponding bit of the information that is being cryptographically secured. If the cryptographic key bit is zero then the cryptographic algorithm would not apply the cryptographic key to the information to be cryptographically processed leaving the corresponding information bit unchanged. This masking process is performed on each bit of the information. In one aspect, the corresponding bits of the cryptographic key and the data are processed through an exclusive OR operation (XOR) to generate new protected data. When a data word has less bits than the cryptographic key like for byte operations, only the cryptographic key bits corresponding to valid data bits are applied to the XOR operation. In one aspect, a cryptographic key mask is applied for cryptographic processing of page table data and other special data. The cryptographic key may not be applied to all of the special fields of the page table data such as access control, table level identifiers, and upper unsupported address bits. In one aspect, the page table data is processed with a unique cryptographic key from the other program data. In another aspect, a cryptographic mask is used to control the application of the cryptographic key to the page table data during cryptographic processing. When an information field to be protected is small, special care is taken as they may be more susceptible to attack.

In one aspect, cryptographic protection for a network interface uses a modified OTP key to communicate with a central processing unit and memory and a second level of cryptographic protection may use a public code when communicating using a network. Once the secret-key algorithm is in place to encrypt secret information, there needs to be a way to exchange the secret keys. In other words, there needs to be a way to certify the authenticity of some information.

Public-key ciphers can handle these tasks, and provide some real advantages over secret-key ciphers alone. The increased key size generally pays for itself by solving problems that are much harder to solve through secret-key techniques. In one aspect, hardware-based Elliptic Curve Cryptography for network messages may be used.

There are computer system performance and functional reasons why an address should be divided into fields for separately applying cryptographic keys. Aspects herein describe the methods for cryptographic key application without significantly impacting the computer system performance. In one aspect, the lower address bits used for a cache line byte address are not modified by a cryptographic algorithm. This cache line byte address field would typically address the byte or bytes of a 64 byte cache line for aspect.

The cryptographic key sets are entered during a computer system boot procedure. This may be entered manually at a console device. In an aspect, the console device is not connected to a network and is only connected to the target computer system. This cryptographic key set is entered before the operating system can execute. In one aspect, separate cryptographic key sets may be associated with different users for their applications. A user's cryptographic key sets would be swapped in with a processor context switch to the user's application. This would provide protection of information between users. A user could not leave a virus or other malicious code to gather unauthorized information from other users.

Once a group of cryptographic key sets have been entered, they are stored so they can be used. In one aspect, the cryptographic key storage is written once after power-up and may not be read except by cryptographic circuits. In another aspect, the cryptographic key storage is written for each user context switch and is stored in a memory that is only hardware accessible.

In one aspect, a novel, cryptographic key storage and cryptographic key storage management is provided. Preferably, each computing system will have a different cryptographic key set and will not be allowed to share program executables. As discussed, any program to be executed on a protected computer system is pre-processed by a translation program using the cryptographic boot key set. If each user also has a cryptographic key set, then that cryptographic key set will be needed for each user application and have its own key storage. This translation program preferably is executed on a different computer system to prepare the protected target computer system operating system. The translation program itself similarly would be translated on a different computer system if it is going to be executed on the protected target computer system. It provides additional protection if the translation program is not made available on a network attached computer system.

In one aspect, it is desirable that the cryptographic key value not change due to errors during the computer system program execution. There could be a number of causes of cryptographic key errors, hardware faults or cosmic events. In one aspect a self-correcting majority voting hardware circuit is used to protect the integrity of the cryptographic key sets while keeping the cryptographic key sets hidden.

In one aspect, a non-volatile memory may be used to store a group of cryptographic key sets as it generally will be hard for an attacker to gain physical access to the system. Having the group of cryptographic key sets stored in the computer system would be convenient. In one aspect, the group of cryptographic key sets may be reentered each time the protected computer system is rebooted. In another aspect, the group of cryptographic key sets is stored for retrieval at boot time.

One challenging aspect of a cryptographically protected computer system is to allow easy software updates and command processing through a system network by authorized personnel while simultaneously making it difficult for unauthorized system access. As companies move to reduce costs, infrastructure systems controls become more automated and networked. This trend makes them more vulnerable to a cyber-attack requiring protection without the loss of the networked advantages. These networks might be private, but they share routers with open networks for cost reasons. There also may be ways to gain unauthorized wireless access to private networks or computer viruses can be intentionally or unintentionally brought into a secure facility on portable devices like USB flash drives.

In one aspect, a cyber-attack protection scheme that uses redundancy and cryptographic processing protection to defend real-time process controllers is provided. Real-time controller devices present many complications in determining which redundant device has been compromised by a cyber-attack. Real-time systems do not always have the luxury of computing the exact same output value in each of the redundant units as the sensors have tolerances including drift. The use of separate sensors may also lead to different controller input values. Even the sharing of the same sensor by the redundant controllers may also result in different input values to the redundant controllers unless they all sample the data at exactly the same time through some lock-step or strobe mechanism. The use of this mechanism will introduce additional single points of failure reducing the benefits of redundancy.

In one aspect, a programmable controller detection system that can detect hardware failures of both Byzantine and deliberate slow changing cyber-attack faults is provided. For example, measuring the gas pressure in a pipeline or the location of a target will have a tolerance between the calculated and actual real world value. If the software were maliciously modified to slowly adjust the results of all of the redundant controllers within the allowed tolerance whereby not triggering normal fault detection, over time the calculated value could be moved outside normal operating tolerances causing damage to infrastructure, disrupting operation, or making systems ineffective.

In one aspect, only one of the redundant controllers is allowed to update its program store within a programmable time window. Each controller passes a cryptographically protected message to a global voting device periodically. If, for example, two good messages are passed to the global voting device after a program update, an update token is released and another controller is allowed to be updated. If two validated messages are not received within a time window the program store update token is not released and a manual or special operator action is used to release the program store update token. Instruction flow on the failing controller is also reverted to the backup program image and execution restarts. In one aspect, if a backup program stored at a program storage fails to produce two or more good messages, a redundant computer controller is brought offline, disabled, using manual or special operator action to bring the controller back online. The remaining controllers continue to function without interruption. In one aspect, the message passed to the global voting devices uses a special cryptographic key to produce a valid message.

An update token for non-redundant system configurations application or code load is faulted if a correct message is not received within a time window defined by a threshold time value and instruction execution flow on the protected controller is reverted back to the backup program image and program execution resumes.

In yet another aspect, a modified OTP private cryptographic key is used to improve processor performance as the cryptographic processing is performed by XOR operation of the cryptographically protected data, program instructions, program data, communications packets, etc., with the modified OTP cryptographic key. The modified OTP cryptographic key is a sequence of random numbers. This sequence may match the size width and depth bit-for-bit with the information being cryptographically protected or the key may be smaller with a repeating indexed access. The modified OTP cryptographic key may also be wider containing more bits than the information being cryptographically processed without some used or bits being applied multiple times.

In one aspect a linear feedback shift register (LFSR) is used to generate the modified OTP cryptographic key set. The LFSR may be 128 bits or larger and is seeded with a unique value. In one aspect, the LSFR is programmable to select different feedback options. In another aspect, the modified one-time key is loaded from an external source. In one aspect, there are levels of indirection added into the modified OTP cryptographic key access selection. In the simplest case, the OTP access index is based on the virtual or physical address used to identify the program instruction or the data location. In one aspect, the seed of the LFSR used to generate the modified OTP cryptographic key set is loaded by using screen entry and not keyboard entry. In one aspect, a full OTP cryptographic key set is supplied directly. In yet another aspect, one or more seeds are supplied and a LFSR uses the supplied seed or seeds to generate the modified OTP cryptographic key set. In another aspect, both direct entry and seeded LFSR are used to form the modified OTP cryptographic key set.

In one aspect, cryptographic-aware program debug tools are used to assist with software testing and development. In one aspect, a computer system can be booted with all bits of modified OTP key sets containing a zero value for development, debugging, or testing purposes. A zero modified OTP cryptographic key will not modify the original data. In another aspect, the system prevents use of simple cryptographic keys like an all zero value key. In yet another aspect, the system prevents unauthorized personnel from rebooting the protected system and providing a cryptographic key of their choice. In one aspect, an operating system, like Windows® (without derogation of any trademark rights of Microsoft Corporation), may be booted with an all zero modified OTP cryptographic key set, but each application may require the use of a non-zero modified OTP cryptographic key set that is activated upon a context switch for proper application operation. In one aspect, the all zeros modified OTP cryptographic key set is generated by the LFSR loaded with an all zero LFSR seed.

In one aspect, each program application including the operating system uses a unique cryptographic key set. In another aspect, each system user and the operating system uses a unique cryptographic key sets. In yet another aspect, each virtual machine and the operating system would have a unique cryptographic key sets.

In one aspect, biometrics may be used as part of the cryptographic key set, LFSR seed, or to control the cryptographic processes. In another aspect, a combination of biometrics and a user entered password is used as part of the cryptographic key set, LFSR seed, or to control the cryptographic algorithm. In yet another aspect, a device uses the Global Positioning System (GPS) location as part of the cryptographic key set, LFSR seed, or to control the cryptographic algorithm of the cryptographically protected system. The inclusion of GPS information may be used to make devices inoperable outside of a geographical region.

System 100:

With the foregoing background in mind, the systems and methods of the present disclosure will be described in more detail with respect to example embodiments disclosed in the figures. It is understood that various other embodiments and aspects of the disclosure are also disclosed and described herein and more fully describe the scope of the disclosure in various aspects. In one aspect, FIG. 1 is a block diagram of system 100 that may include a secure computer, processor or controller system 100 with multiple redundant programmable controllers or computers 102A-102N. This aspect is not intended to limit the number of redundant programmable controllers/computers/computing devices 102A-102N to any specific number. The number of programmable controllers or computers 102A-102N may vary from system to system from 1, no redundancy, to any other number. The secure system 100 also includes system inputs 140, optional sensor inputs from the sensor device 142, an optional selector module 144, an optional voting controller module 146 and a system output 150.

As illustrated, according to an aspect, the programmable controllers or computers 102A-102N may each include a host memory 104, a storage interface 108, an input interface 113, a network interface 122, a cryptographic-protected central processing unit 116 (may also be referred to as CPU 116), a program store control 128, and multiple program stores, illustrated as program store A 136 and program store B 138. The CPU 116 may also be referred to as a processor or processing module and may be, or may include, one or more programmable general-purpose or special-purpose microprocessors, digital signal processors (DSPs), programmable controllers, application specific integrated circuits (ASICs), field programmable gate array (FPGA), programmable logic devices (PLDs), programmable logic controller (PLC), or the like, or a combination of such hardware-based devices.

The host memory 104, also referred to as central memory, may comprise local and/or remote memory that is used by the cryptographically protected CPU 116 to store program data and/or program instructions. This memory may include one or more of static random access memory (SRAM), dynamic random access memory (DRAM), Flash, ferroelectric random access memory (FRAM), parameter random access memory (PRAM), magneto-resistive random access memory (MRAM), other Phase Change Memory, disk-based memory—such as hard drives (HDD) or hybrid storage drives (SHDD), solid state memory (SSD), or other types of storage. The adaptive aspects disclosed herein are not limited to any specific memory type. The host memory 104 is connected to the cryptographically protected CPU 116 by memory interface 106. Memory interface 106 supports a memory interface protocol like PC100, PC133, DDR2, DDR3, DDR4 or other protocols. DDR stands for double data rate and PC100, PC133 refers to synchrous DRAM defined by JDEC standards.

In one aspect, the cryptographic key sets are stored along with one or more program(s) and instructions and program data in host central memory. The memory locations that store the cryptographic key sets are not accessible through software or other means except by the cryptographic processing hardware. In one aspect, cryptographic processing is performed in a single memory system that holds both the program instructions, data and the cryptographic key sets. The program instructions and data are just stored at different memory locations. In another aspect, all storage and cryptographic processing is performed on the same memory device or the die used for the memory device.

The storage interface 108 may be an optional component. When present, it provides an interface between the CPU 116 and slower storage devices including disks, tapes, storage area networks (SANs), or other large storage devices. The storage interface preferably supports storage protocols such as Serial Attached SCSI (SAS), Serial Advanced Technology Attachment (Serial ATA or SATA), SCSI, Fibre Channel, Ethernet, InfiniBand, or other storage protocols. The various aspects disclosed herein are not limited to any specific protocol.

The system inputs 140 may include real world conditions that are sensed such as, for example, flow, pressure, physical position, light, voltage, current, temperature, liquid level, velocity, movement, thickness, material composition, molecular presence, or any other property to be sensed. In one aspect, the system inputs include user data either stored, generated or entered.

The optional sensor device(s) 142 convert(s) the system inputs 140 into electrical signals 154 if needed. These electrical signals 154 may be analog or digital and support protocols like DeviceNet, DeviceNet w/Quick Connect, Ethernet, PROFIBUS-DP, CANopen, PROFINET, DeviceNet w/DeviceLogix, 4-20 mA current loop or other signaling protocols. The optional sensor device 142 is connected to the input interfaces 113 within the programmable controllers or computers 102A-102N. The various aspects disclosed herein are not limited to any specific protocol/interface for receiving the inputs.

The input interface(s) 113 provides a digital estimated representation of the output 154 of sensor device 142. The output 114 of input interface 113 is sent to the cryptographically protected CPU 116 may be of the form of network messages like Ethernet, Inter-Integrated Circuit (I$^2$C), RS232, RS432, RS433, RS485, etc., or general purpose processor input/output (I/O). The conversion, in some aspects, from real world analog system inputs 140 to a digital estimated representation 114 may be accomplished by a Digital to Analog Converter that may reside in the sensor device 142 or input interface 113. In another aspect, the sensor device 142 and input interface 113 are combined and the real world inputs 140 go directly into input interface 113. In yet another aspect, the data to be processed is input into CPU 116 though storage interface 108, network interface 122 or other methods.

The cryptographically protected CPU 116, is a central processing unit that executes cryptographically protected program instructions on cryptographically protected data. One aspect of the cryptographically protected CPU 116 is shown in more detail in FIG. 2 and described below. The cryptographically protected program instructions control the processing of the input data 114 and generate the control output 118. The cryptographically protected program also processes network information from signal 124 output of a network interface 112 and signal 110 output of a storage interface 108. The cryptographically protected instructions for the cryptographically protected CPU 116 are received from the program store control 128 via interface signals 130. The cryptographically protected data for the cryptographically protected CPU 116 are received from the host memory 104 via interface signals 106.

The optional output interfaces 120 convert the digital cryptographically protected CPU 116 output signals 118 into real world control signals 148A-148N from programmable controllers' 102A-102N respectively. The control signals 148A-148N may be either analog signals, digital signals or a mix of both depending on the system requirements. The output control signals 148A-148N may support protocols like Ethernet, SCSI, SAS, I$^2$C, RS232, RS432, RS433, RS485, discrete signals or other protocols.

The network interface 122 is used for communications between a control device 170 and the programmable controllers or computers 120A-102N. This connection 172 may include direct connections between control device 170 and network interfaces 122 or may be connected through routers or switches. The network interface 122 may support protocols like Ethernet, I$^2$C, supervisory control and data acquisition (SCADA), RS232, RS 432, RS433, RS485 or others. The network interface 122 also connects with the cryptographically protected CPU 116 via signals 124 using protocols like Peripheral Component Interconnect (PCI), PCI Express (PCIe), discrete signal general purpose I/O (GPIO) or others. In one aspect, the network interface 122 also communicates with the program store control 128 via signals 126. In another aspect, the connection signals 126 may not be used, and the information normally conveyed over signals 126 between the network interface 122 and the program store control 128 transitions through signals 124 to the cryptographically protected CPU 116 and then to the program store control 128 via signals 130. The interface signals 126 between the network interface 122 and program store control 128 are used to manage the program store from control device 170. This communication of management commands may include functions such as program updates, fail over of redundant programmable controllers or computers 102A-102N, predictive maintenance, status, other maintenance functions, and other functions.

The program store control module 128 manages the programmable controller or computer 102A-102N program storage. The program storage is used to store software programs that are executed by cryptographically protected CPU 116. In one aspect, the program store is a basic input/output system (BIOS). The program store control 128 selects between active and backup program storage, which may include program store A 136 and program store B 138. In one aspect, program store A 136 and program store B 138 are just different areas or addresses within the same storage. The flow process of one aspect of the program store control 128 is shown in more detail in FIG. 6 and described below. The program store control 128 receives requests from network interface 122. This request includes commands to update program store, fail over and other commands. The program store control 128 communicates with the cryptographically protected CPU 116 via signals 130, voting control module 146 via signals 152A, program store A 136 via signals 132, and program store B 138 via signals 134. Either program store A 136 or program store B 138 may be or may comprise the active or the backup program storage.

In an aspect, the active selection alternates between them during successive program store program updates.

The program store A 136 and program store B 138 are used to store the cryptographically protected program instructions executed by the cryptographically protected CPU 116. The program store A 136 and program store B 138 may be constructed from Flash, SRAM, DRAM, Non-volatile RAM (NVRAM), HDD, SDD, SHDD, or any other type of storage memory device. In one aspect, one or both program store A 136 and program store B 138 reside in host memory 210. The selection between active and backup program store is selected by program store control 128. The general flow is that the backup program store is updated with a new cryptographically protected software program. After the program update is complete and an update token is available, the program store control 128 makes the backup program storage the active program storage on a trial basis. If the new, updated cryptographically protected software program does not meet requirements as measured by the voting control module 146, the program store control 128 reverts back to the previously validated cryptographically protected software program and, optionally, blocks additional software program updates. This software program update blocking may take a number of programmable forms including blocking for a fixed time after the update failed, requiring an override code, manual action to the programmable control or other actions. Notification of failed attempts may include email notification, light activation or audio alarms. The manual action may require a switch activation at the programmable controller or computer 102A-102N, power down of the programmable controller or computer 102A-102N or other manual physical action that can only be taken by authorized personnel that have physical access to the programmable controller or computer 102A-102N. In one aspect, notification is given to an administrator when program store updates are attempted. This notification could take many forms including but not limited to, lights, emails, text messages, telephone calls, instant messages, website notifications or any other means of directing attention to the program update attempt. In one aspect, the system administrator is required to enter an authorization code to allow program store update.

The optional voting control module 146 interacts with programmable controllers or computers 102A-102N to determine which ones are functioning correctly. A fault may include a hardware fault, software program fault, or cyber compromised induced fault. The voting control module 146 receives program controller health information from the program store control or another method, like network data packets, to assess the programmable controller or computer 102A-102N heath to make a selection on which output 148A-148N be used as the system outputs 150. It also decides if cryptographically protected software updates should be applied and made active.

The selector 144 selects which programmable controller or computer 102A-102N outputs 148A-148N to use as the system outputs 150. In an aspect, the selection is determined by the voting control module 146 and communicated to the selector 144 via signals 164. The selector 144 operates like a switch matrix to deliver the desired system outputs 150.

The system outputs 150 may be used to control physical systems and/or provide system status information. The outputs 150 may support protocols like Ethernet, SCSI, SAS, I²C, RS232, RS432, RS433, RS485, discrete signals or other protocols. In one aspect, the system outputs 150 are computed results delivered, displayed or stored.

Figure 2:
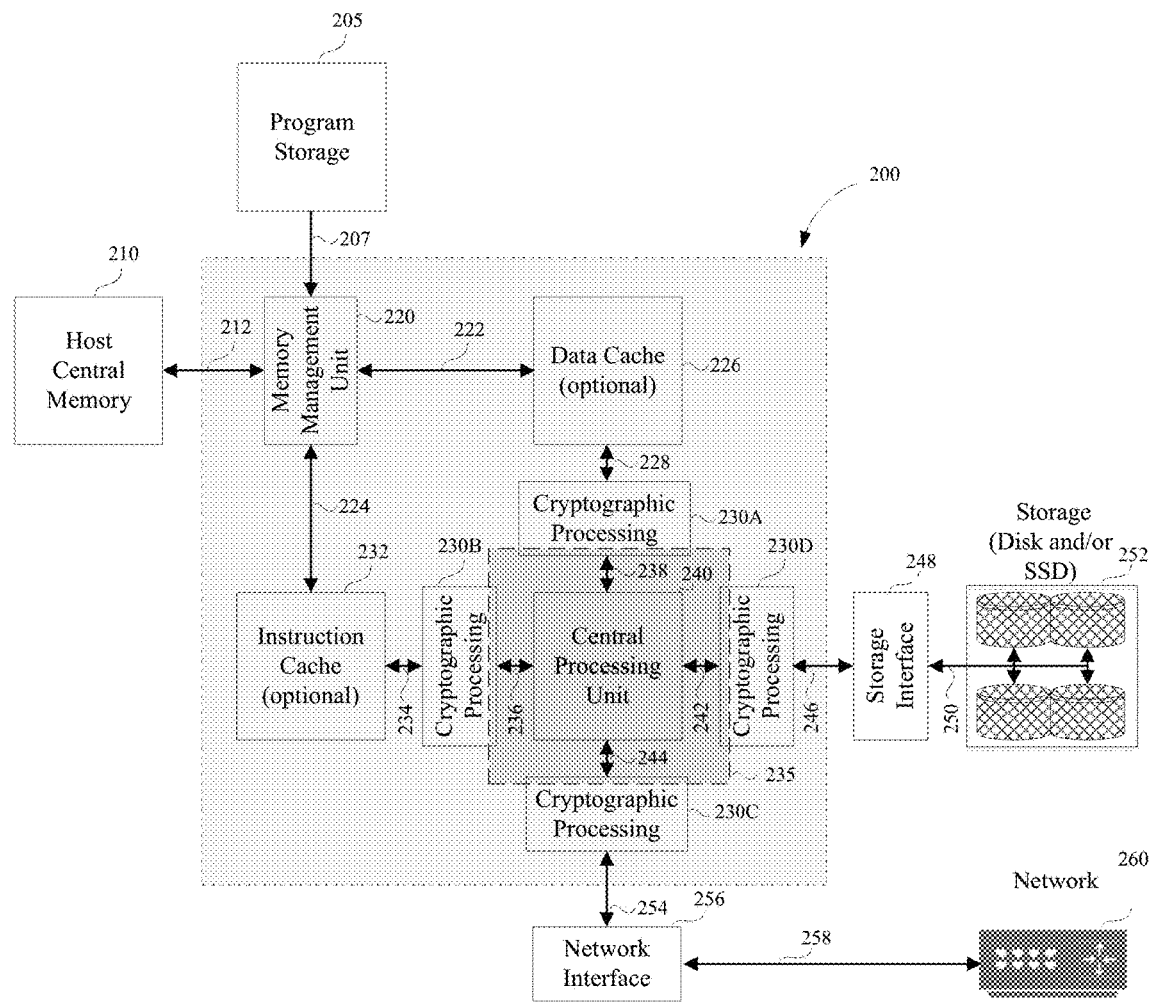
FIG. 2 is a block diagram of an apparatus of a secure central processing unit, according to one aspect of the present disclosure.

System 200:

FIG. 2 shows a system 200 for a protected CPU (for example, 116, FIG. 1), according to one aspect of the present disclosure. As illustrated, System 200 interfaces with a host central memory 210 (similar to 104, FIG. 1), also referred to as central memory. Memory 210 maybe a local or remote memory that is used by the cryptographically protected CPU 240 to store cryptographically protected program data by cryptographic modules 230A-230D that are also described in more detail with respect to FIG. 4, item 402. The host central memory 210 is connected to a memory management unit 220 via signals 212. The interconnect signals 212 represent any number of memory interfaces that alone or together support a memory interface protocol like PC100, PC133, DDR2, DDR3, DDR4, ONFi, toggle-mode DDR, Wide I/O, High Bandwidth Memory (HBM), High-speed Memory Controller (HMC), and/or other protocols. The host central memory 210 may be constructed from SRAM, DRAM, Flash, EPROM, EEPROM, ROM, FRAM, PRAM, MRAM, other Phase Change Memory, disk, HDD, SSD, SHDD, or other types of storage. In one aspect, all of the information in the host central memory 210 is cryptographically protected information.

Program storage 205 (similar to program store control 128, FIG. 1) stores cryptographically protected program instructions and is connected to the memory management unit 220 via signals 207. The interconnect signals 207 represent any or multiple of a number of memory interfaces including PC100, PC133, DDR2, DDR3, DDR4, ONFi, toggle-mode DDR, Wide I/O, HBM, HMC or other memory interface standards. The program storage 205 may be constructed from ROM, EPROM, EEPROM, Flash, SRAM, DRAM, FRAM, PRAM, MRAM, other Phase Change Memory, disk or other types of storage device. In one aspect, program storage 205 and host central memory 210 connect to the same interface signals. In another aspect, program store 205 and host central memory 210 are the same or share the same memory devices. In one aspect, all of the information stored in the program storage 205 is cryptographically protected information.

In one aspect, the memory management unit 220 provides an interface between host central memory 210 and a data cache 226, if present (or used) and the CPU 240 if the data cache 226 is not present. The memory management unit 220 provides the interface between program store 205 and an instruction cache 232 if present and the CPU 240 if the instruction cache 232 is not present.

In one aspect, the data cache 226 is used to hold a local copy of cryptographically protected program data typically resulting in lower latency and higher bandwidth data accesses, as described below in detail. For this aspect, the CPU 240 makes a data load or read request. Normally the load or read request includes an address (referred to as request address or request data address). The address may provide addressing information to a word or byte level depending on the processor system type. The address is cryptographically protected by the cryptographic processing module 230A. In one aspect, only part of the request data address is cryptographically protected to allow the data cache 226, to maintain its cache line address quantization of byte addresses into cache line addresses and to stay within maximum system supported addresses. The grouping of a byte or word address into a larger cache line address improves overall cache efficiency.

In one aspect, the data cache 226 receives the read data request via interface signals 228. The data cache 226 performs a directory lookup using the cryptographically protected request address to see if a local copy of the requested data is currently available at the data cache 226. If a copy of the requested data is not currently available at the data cache 226, the data cache 226 requests a cache line data from the host central memory 210 through the memory management unit 220 using interface signals 222. After the requested cryptographically protected data is returned from the host central memory 210, a local copy of the cache line is stored at the data cache 226 and, the requested cryptographically protected data is sent to the CPU 240 through the cryptographic processing module 230A, which performs decryption of the data and then sends the non-cryptographically protected data to the CPU 240 via interface signals 238.

If a local copy of the requested cryptographically protected data resides at the data cache 226, the metadata associated with the corresponding cache line is updated and the requested cryptographically protected data is returned to the CPU 240 by the cryptographic processing module 230A which decrypts the data and sends the decrypted data to the CPU 240 via interface signals 238.

In yet another aspect, the CPU 240 makes a store or write request to the data cache 226 and host central memory 210. For the write request, the address and write data are sent by the CPU 240 to the data cache 226 through cryptographic processing module 230A via interface signals 238 and 228. The cryptographic processing module 230A encrypts both the request address and write data before sending the request to the data cache 226. The CPU 240 under program instructions may elect to write only a portion of the cache line, such as, for example, a byte write or word write, the cryptographic processing using the modified OTP (one-time pad) allows for a single byte or more to be cryptographically protected without using a read-modify-write operation as required by conventional cryptographic processing methods. A copy of the cryptographically protected write data may or may not be stored at the data cache 226 based on the request type and associated cache write policies. If a local copy of the cryptographically protected data is stored at the data cache 226, the data is updated along with metadata associated with the corresponding cache line.

The cryptographic processing module 230A performs the cryptographic processing of program data leaving or entering the CPU 240 respectively. The data request information transferred between the data cache 226 and the cryptographic processing module 230A via interface signals 228 is protected by cryptographic processing. The data request information transferred between the CPU 240 and cryptographic processing module 230A via interface signals 238 may not be protected by cryptographic processing.

The box 235 provides a pictorial representation of the system information cryptographic boundary. In one aspect, information inside box 235 is information that may or may not be cryptographically protected. When information inside box 235 is cryptographically protected then multi-level cryptographic processing is performed for added protection from interpretive program execution processing, just in time compilation, or special data handling. In one aspect, interpretive program execution processing or just in time compilation is not allowed to execute on the computer system of FIGS. 1 and 2. In another aspect, interpretive program execution processing or just in time compilation use an all zero modified OTP cryptographic key while the underlying program uses a non-zero modified OTP cryptographic key. In yet another aspect, interpretive programs or just in time compilation are modified to perform cryptographic processing during program execution. The program data cryptographic processing performed by cryptographic processing module 230A uses a modified OTP type cryptographic processing methods to meet high performance processing requirements and not impact memory bandwidth to and from the CPU 240.

In one aspect, the cryptographic processing module 230A is operationally located between host central memory 210 and memory management unit 220. In another aspect, each stored program instructions, application code or any processor executable thread executed by the CPU 240 may have a unique set of cryptographic keys associated with them. In yet another aspect, each user of the system may use a unique set of cryptographic keys. In yet another aspect, each virtual machine (when applicable) uses a unique set of cryptographic keys.

In one aspect, information except specific specialized commands and address fields outside of box 235 are protected by cryptographic processing. In some aspects, exceptions to all data outside box 235 being cryptographically protected may be made for performance reasons, private key protection, and/or to allow the use of standard devices as described in the various aspects herein.

In one aspect, double cryptographic processing maybe used on non-volatile stored data in the storage and network data. This allows different applications to share resources without allowing unintended or unauthorized bleeding of data between applications.

In one aspect, the optional instruction cache 232 is used to hold a local copy of cryptographically protected program instructions and constants typically resulting in faster program execution. For example, the CPU 240, communicating through signals 234, may make an instruction fetch, or instruction pre-fetch, that normally includes an instruction address. The requested instruction address is cryptographically protected by the cryptographic processing module 230B. In one aspect, only part of the requested instruction address is cryptographically protected to enable the instruction cache 232 to maintain cache line address quantization of byte addresses into cache line addresses and to stay within maximum system supported addresses.

In another aspect, the upper address bits of a request instruction address are not cryptographically protected to prevent an access to a memory location that is out of range for the system. In yet another aspect, different parts of the instruction address are cryptographically protected using separate, unique cryptographic keys. The use of multiple cryptographic keys increases system security making it more difficult for unauthorized determination of the private cryptographic key set.

The instruction addresses of an executing program tend to follow predictable patterns of change over time, which may disadvantageously aid in the reverse engineering of the original cryptographic key set. Specifically program instruction addresses tend to increment sequentially and loop back to previous addresses. In one aspect, segmenting the application of different cryptographic keys to different address fields makes private cryptographic key determination more difficult.

The instruction cache 232 receives instruction fetch requests from the CPU 240 through cryptographic processing module 230B via interface signals 234 and 236. The instruction cache 232 performs a directory lookup using a cryptographically protected instruction address to determine if a local copy of the cryptographically protected instruction is stored at the cache 232. If a copy of the requested cryptographically protected instruction is not present within the instruction cache 232, the instruction cache 232 requests a cache line encompassing the requested program instruction from program storage 205 through the memory management unit 220 via interface signals 224. After the requested cryptographically protected program instruction data is returned from program storage 205, typically a local copy is stored in the instruction cache 232 and the requested cryptographically protected instruction is sent to the CPU 240 through the cryptographic processing module 230B which performs decryption of the instruction and sends the decrypted instruction to the CPU 240 via interface signals 234. If a local copy of the cryptographically protected program instruction resides within the instruction cache 232, typically metadata associated with the corresponding cache line is updated and the requested cryptographically protected program instruction is returned to the CPU 240 through the cryptographic processing module 230B which performs decryption of the instruction and sends the decrypted instruction to the CPU 240 via interface signals 234 and 236. In one aspect, the instruction cache 232 is not present, bypassed or is not functional in the system and the CPU 240 instruction requests are made directly to the memory management unit 220 or program storage 205 directly through cryptographic processing module 230B.

The cryptographic processing module 230B is conceptually similar to cryptographic processing module 230A. In one aspect, cryptographic processing module 230B and cryptographic processing module 230A share the same cryptographic processing circuits. In one aspect, cryptographic processing module 230B shares the same cryptographic processing circuits with cryptographic processing module 230C or cryptographic processing module 230D or cryptographic processing module 230A. In one aspect, differences between cryptographic processing module 230B and cryptographic processing module 230A may include how the cryptographic processing algorithms are applied to the request address and the returned data or instruction, respectively. For both data and instruction cache requests in present aspects the lower bits of the request address, the bits that address the bytes within a cache line, are either not cryptographically protected or are cryptographically protected with a separate cryptographic key or special method to create obfuscation within a cache line address range. In another aspect, the requested instruction address is further segmented into upper and middle address fields. For both data and instruction cache in present aspects the upper bits of the request address, the bits of address that address unsupported memory locations, are not cryptographically protected. The middle address may be further segmented to support pages. The higher order bits of the middle address field select a page and the low order bits within the middle address field address the cache line sized blocks within the pages. In one aspect, the two sub segments within the middle address segment are cryptographically protected using separate cryptographic keys. The request address segmentation is described in more detail in FIG. 5. In yet another aspect, the request address field segmentation boundaries are programmable to allow different cache line sizes or page sizes, or to support other features, cryptographic processing algorithms, match hardware systems or software application. In yet another aspect, the cryptographic keys are not applied uniformly over the instruction to improve obfuscation of the instruction.

In one aspect, the cryptographic processing module 230C is functionally similar to cryptographic processing module 230A. However, in some aspects, there may be differences in how the cryptographic processing algorithms are applied to the information passing through. Cryptographic processing module 230C processes network information normally segmented into packets. In one aspect, there are fields of information within the network packs that are not cryptographically protected. In one aspect, network packet headers would remain non-cryptographically protected as they may be needed to route the packets through standard networking devices while the data payload is cryptographically protected. The network information is transferred between the network interface 256 and the cryptographic processing module 230C via interface signals 254 is protected by cryptographic processing. The network information transferred between the CPU 240 and cryptographic processing module 230C via interface signals 244 is not protected by outer encryption but may be protected by an inner or second level of encryption.

In one aspect, the cryptographic processing algorithm performed by cryptographic processing module 230C uses the source or destination of the network packet to modify and control the application of the cryptographic key. Some real-time devices may not support the cryptographic processing of the packet payload. In another aspect, some of the real-time network devices support cryptographically protected data packet payload. In another aspect, cryptographic processing module 230C supports a mix of network devices on the same network that both support and do not support encryption in the information packets.

In yet another aspect, packets that fail a CRC (cyclic redundancy code) check after decryption are discarded without action from the CPU 240 to protect from a denial of service type cyber-attacks. In yet another aspect, the CPU 240 exchanges cryptographic keys with network devices. These cryptographic key exchanges may be protected by factory or manually set unique cryptographic keys used only for the purpose of further exchange of cryptographic keys. In one aspect, cryptographic processing module 230C share the same cryptographic processing circuits with cryptographic processing module 230D, cryptographic processing module 230B or cryptographic processing module 230A.

In one aspect, the cryptographic processing module 230D is functionally similar to cryptographic processing module 230A. The difference may be in how the cryptographic processing algorithms are applied to information passing through the cryptographic module 230D. Cryptographic processing module 230D processes storage data. Storage data is typically intended for longer term retention stored in non-volatile memory. Storage data transfers typically include header information that contains address, command and status information. The storage information transferred between the CPU 240 and cryptographic processing module 230D via interface signals 242 is not protected by outer encryption but may be protected by an inner or second level of encryption.

In one aspect, the cryptographic processing algorithm performed by cryptographic processing module 230D uses a source or destination of a storage packet to modify and control application of cryptographic key set. In one aspect, command fields of a storage data header are not subject to cryptographic processing to allow operation with standard, non-secured storage devices. In another aspect, the address fields of the storage data header are not subject to cryptographic processing to allow operation with standard storage devices. In yet another aspect, storage information is cryptographically protected including the address and command fields of the storage data header. In yet another aspect, the storage data header information is cryptographically protected using a separate unique cryptographic key set. In another aspect, the storage data header key is exchanged between the CPU 240 and cryptographic processing module 230D and storage devices 252. These cryptographic key exchanges may be protected by factory settings or manually set by unique cryptographic keys used only for the purpose of further exchange of cryptographic keys. In one aspect, cryptographic processing module 230D shares the same cryptographic processing circuits with cryptographic processing module 230C, cryptographic processing module 230B, and/or cryptographic processing module 230A. In one aspect, a packet field is used to select the modified OTP cryptographic key set index. For example, the command field of an information packet would provide an address index, and the index would then be incremented for each additional information packet word. The indexing of the modified OTP is described in more detail associated with address translation SM 415 (FIG. 4) and the flow diagram illustrated in FIG. 9.

In one aspect, the CPU 240 contains logic that executes a series of program instructions operating on program data to produce the desired results. The CPU 240 may support numerous instruction set architectures (ISAs) including but not limited to X86, ARM, Power or custom ISAs. Because most modern central processing units support a pre-fetch instruction buffer, direct user access to this buffer that may contains non-cryptographically protected program instructions should not be permitted.

The network interface 256 is used for network communications between network 260 (for example, Ethernet or any other network type) and cryptographic processing module 230C. The connection interface 254 may be direct connections between the network interface 256 and cryptographic processing module 230C. The interface 258 between the network interface 256 and network 260 may be connected through routers or switches. The network interface 256 may support protocols like Ethernet, I²C, SCADA, RS232, RS432, RS433, RS485 or others. The adaptive aspects described herein are not limited to any particular network type or protocol.

In one aspect, the storage interface 248 is used to provide the interface between CPU 240 and storage devices including disks, tapes, SANs', and/or other mass storage devices 252. The storage interface 248 is used for communications between storage device(s) 252 and cryptographic processing module 230D. The interface signal 246 may comprise direct and/or indirect (networked) connections between the storage interface 248 and cryptographic processing module 230D. The interface signals 250 between the storage interface 248 and the storage devices 252 support storage protocols such as SAS, SATA, SCSI, Fibre Channel, Ethernet, InfiniBand or other storage protocols. The various adaptive aspects of the present disclosure are not limited to any specific storage protocol or technology.

The computer architecture depicted in FIG. 2 sometimes referred to as a Harvard architecture as data and instruction memory are separated. This simplification was made for illustrative purposes only and the present disclosure is intended to also apply to a Von Neumann architecture. In one aspect, the data cache 226 and the instruction cache 232 are a shared cache storing both cryptographically protected program instructions and cryptographically protected program data. In another aspect, the host central memory 210 and program storage 205 share the same memory. In yet another aspect, the address cryptographic processing is performed using the virtual address before any virtual to physical translation occurs and non-encrypted address may be used to access program and data in memory.

Figure 3:
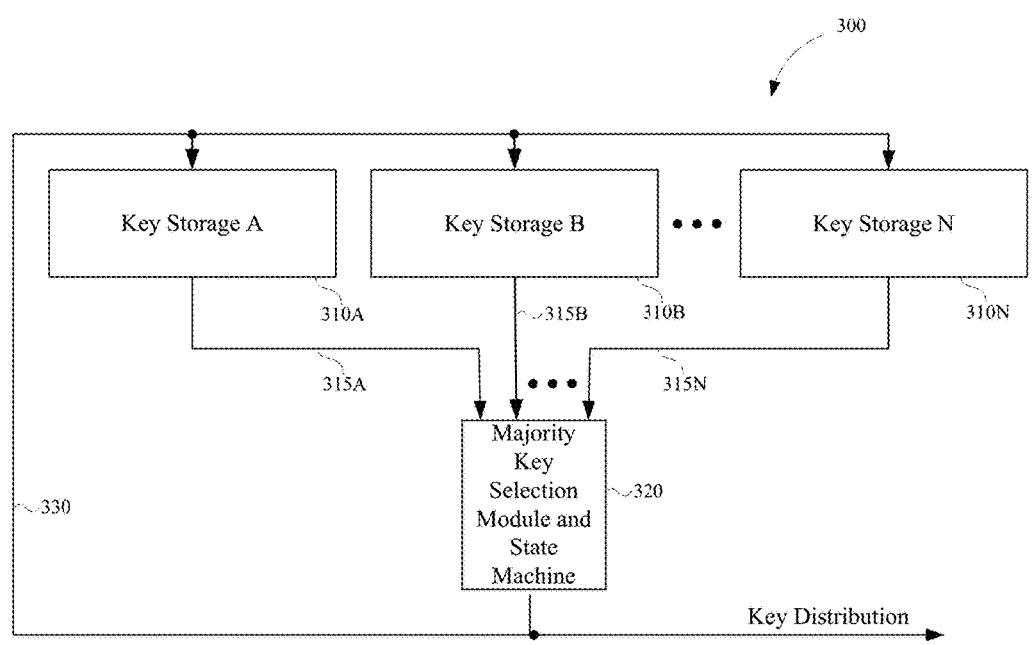
FIG. 3 is a block diagram showing cryptographic key set storage, according to one aspect of the present disclosure.
Figure 8:
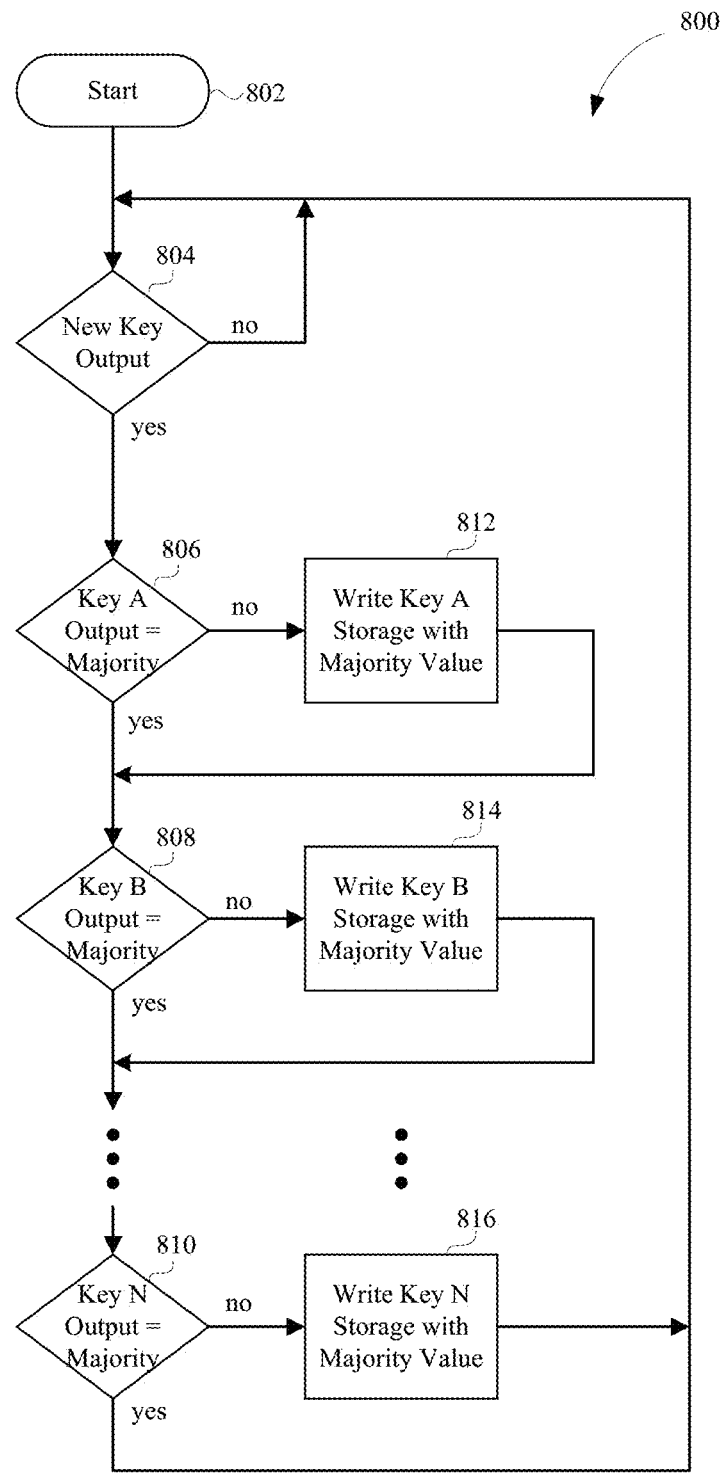
FIG. 8 shows a flow diagram of key majority, voting according to one aspect of the present disclosure.

Cryptographic Key Storage:

FIG. 3 is a block diagram of a system 300 for cryptographic key storage, error recovery, and distribution. In one aspect, redundant key storage 310A-310N may be used to hold redundant copies of cryptographic key(s). The key storage 310A-310N may be constructed from flip/flops, latches, registers, SRAM, DRAM, Flash, EPROM, EEPROM, ROM, FRAM, PRAM, MRAM, other Phase Change Memory, disk, or any other type of storage. For protection, there is limited or no read access, except by the cryptographic hardware, to the key storage 310A-310N. A value of a cryptographic key from the key storage 310A-310N is input into majority key selection and state machine 320 via interface signals 315A-315N. Cryptographic key storage 310A-310N may each hold more than one cryptographic key. In various aspects, a cryptographic key may support Advanced Encryption Standard (AES), Bach's algorithm, Barrett reduction, BB84, beaufort cipher, binary code, block cipher mode of operation, Commercial Data Masking Facility (cdmf), cipher text stealing, common scrambling algorithm, cryptgenrandom, crypto++, cryptographically secure pseudorandom number generator, cycles per byte, feedback with carry shift registers, fuzzy extractor, generating primes, geometric cryptography, hash chain, hasq, hmac-based one-time password algorithm, industrial-grade prime, ismacryp, key schedule, key wrap, Kochanski multiplication, kr advantage, linear feedback shift register, mental poker, modular exponentiation, Montgomery modular multiplication, mosquito, pr-cpa advantage, random password generator, randomness extractor, randomness merger, rc algorithm, residual block termination, rip van winkle cipher, s-box, scrypt, secret sharing using the chinese remainder theorem, securelog, software taggant, substitution-permutation network, summation generator, supersingular isogeny key exchange, symmetric-key algorithm, time-based one-time password algorithm, type 1 product, type 2 product, type 3 product, type 4 product, verifiable random function, OTP, and/or modified OTP or other cryptographic processing techniques. The cryptographic keys in key storage 310A-310N may be identical, but due to errors some copies may not match each other. The stored cryptographic key values are sent from the key storage 310A-310N to the majority key selection module and state machine 320 via interface signals 315A-315N which in turn outputs a cryptographic key distribution signal 330. The majority key selection and state machine 320 process flow is represented in FIG. 8 and described below.

In one aspect, the cryptographic key distribution signal 330 represents the majority of the cryptographic key values stored in key storage 310A-310N. Other cryptographic key distribution signal 330 algorithms may also be used. The cryptographic key distribution signal 330 is supplied to the cryptographic processing circuits and back to key storage 310A-310N. The key storage 310A-310N that includes a cryptographic key value that is not equal to the cryptographic key distribution 330, selected by majority vote or other algorithm is updated with the cryptographic key distribution 330 value. In one aspect, the cryptographic key storage 310A-310N may be a volatile memory device. In one another aspect, the cryptographic key storage 310A-310N is a non-volatile memory device. It is noteworthy that the adaptive aspects described herein are not limited to the memory type.

Figure 4:
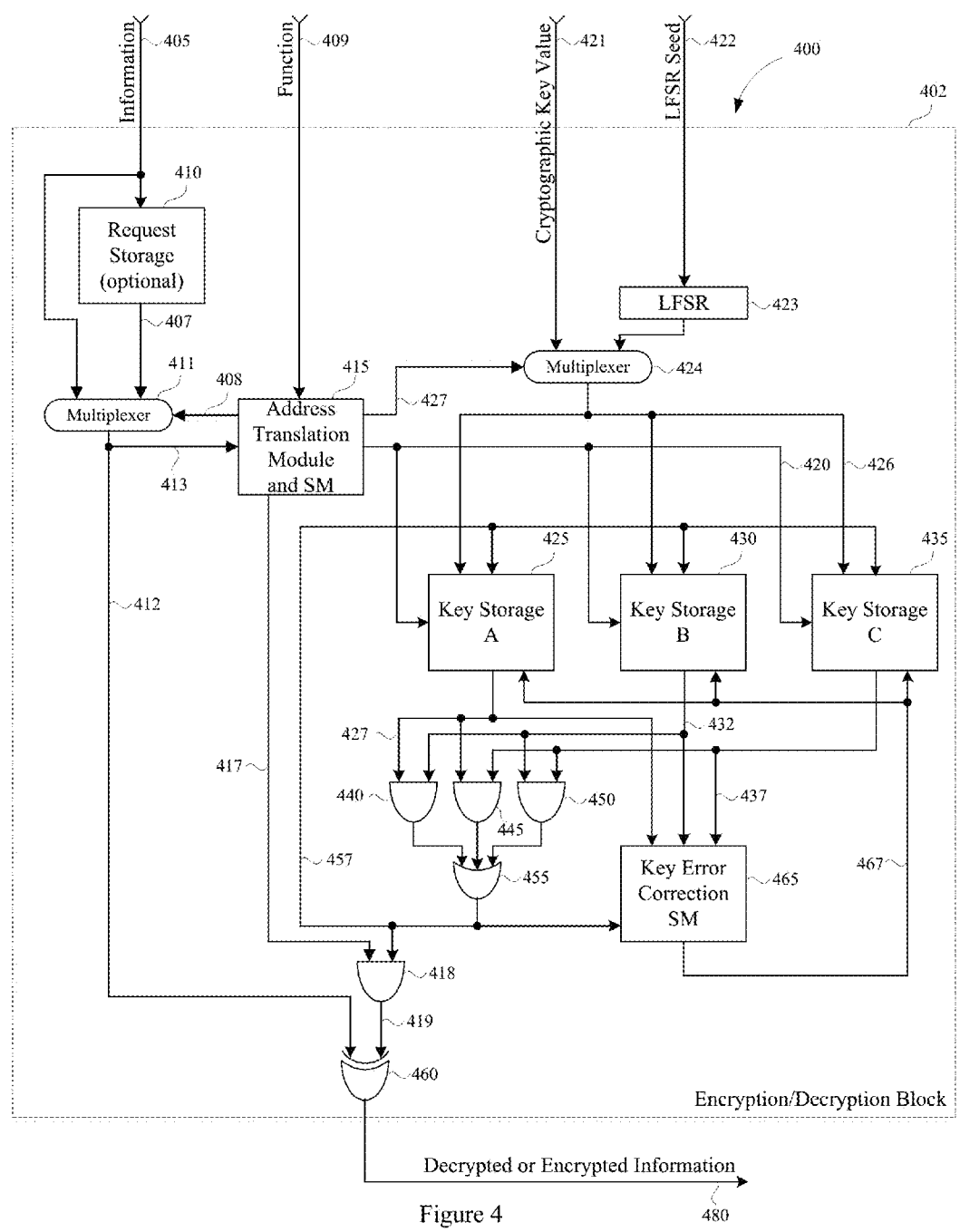
FIG. 4 is a block diagram shows a system used for a cryptographic method for information processing, according to one aspect of the present disclosure.

Cryptographic Processing Circuit:

FIG. 4 shows a cryptographic processing circuit 402 used by the cryptographic processing modules 230A-230D, according to one aspect of the present disclosure. The example shown may use three cryptographic key storage elements 425, 430 and 435 and a majority voting key selection algorithm/process. The three copies of cryptographic keys and majority voting algorithm are shown for illustrative purposes only and are not intended to limit the number of cryptographic key copies or key selection algorithms. Information 405 and function 409 are input into the cryptographic processing circuit 402. The information 405 and function 409 may be supplied by the CPU 240, storage interface 248, and network interface 256, storage of a previous read or load request from request storage 410 or other sources within the system of FIGS. 1/2. The request storage 410 is used to pair requests with a response returned later. In various aspects, the request storage 410 may be used when the request address is not returned with the response. A smaller tag field may be returned by the memory device in lieu of the address. The return of the address or tag field is not used if all request responses are processed in the order that they are submitted and if there is no need to identify the specific request on a failure. The tag field is used to index a table of request addresses. The request address is used to select the cryptographic key after translation by an address translation state machine 415. The address translation state machine 415 controls a multiplexer 411 to either pass the information 405 directly to or get information from the request storage output 407 for cryptographic processing depending on function 409. The selected multiplexer value 412 and 413 is the information that is both used to select the cryptographic key from key storage 425, 430, 435 through address translation and the information to be cryptographically protected. The output from multiplexer 411 is divided into information signal 412, the information to be cryptographically protected, and the address signal 413 to translate using the address translation state machine 415. The translated address, command or other header field is used to index the cryptographic key. The address translation state machine 415 receives function 409 and address signal 413 and outputs multiplexer select signal 408, cryptographic key index signal 420 and cryptographic processing mask signal 417. In one aspect, the cryptographic key index signal 420 is based on a virtual address. The various processes used by address translation state machine 415 is shown in more detail in FIG. 9 and described below.

The cryptographic processing mask signal 417 is used to block the cryptographic processing of information fields. These blocked fields include cache line byte address, upper address, page table data, network address, and control fields among other information. Multiplexer 424 is used to select the cryptographic key values to load into the key storage modules 425, 430 and 435. Multiplexer 424 receives the select control signal 427 from address translation and SM 415. The multiplexer 424 selects between direct load path for the cryptographic key value 421 and the output from LFSR 423. The multiplexer 424 output 426 is written to key storage 425, 430, 435 during the cryptographic key load process. In an aspect, the cryptographic key is many words long and may use multiple load cycles. LFSR seed 422 is input into the LFSR 423 at the start of a cycle to generate a pseudo random sequence of values to be optionally loaded into key storage 425, 430 and 435.

The cryptographic key storage 425, 430 and 435 is used to store copies of a modified OTP cryptographic key. The interface signals 427, 432, and 437 connect the cryptographic key storage modules 425, 430, 435 respectfully to the key error correction state machine 465 and the majority voting circuit formed by AND gates 440, 445 and 450. The outputs from these AND gates are then passed through an OR function together at OR gate 455. These gates are shown as a single bit for illustrative purposes, but a set may be utilized for each bit of the cryptographic key word width. The composite cryptographic key 457 is fed back to the cryptographic key storage to update the storage when key correction is required, AND gates 418 to be gated by the multi-bit mask 417 and a key error correction state machine 465. AND gates 418 may comprise a series of AND gates that combine a current composite cryptographic key 457 with the address translation state machine generated mask 417 for the current masked cryptographic key 419. The current masked cryptographic key 419 may be multi-bits wide and typically the same width as the information 412 from the multiplexer 411 output being cryptographically protected. The current masked cryptographic key 419 is applied to the current information word 412 by XOR gates 460 to produce the decrypted or cryptographically protected information 480.

Key error correction 465 compares the current cryptographic key from each of the key storages 425, 430 and 435 to the current composite cryptographic key 457 and activates the key storage write enable for each key value bit that does not match the corresponding bit of the current composite cryptographic key 457. In one aspect, different bits from different key storage memories may be corrected at the same time. Each bit of the cryptographic key is selected and corrected by majority vote on a bit-wise basis at the same time.

Figure 5:
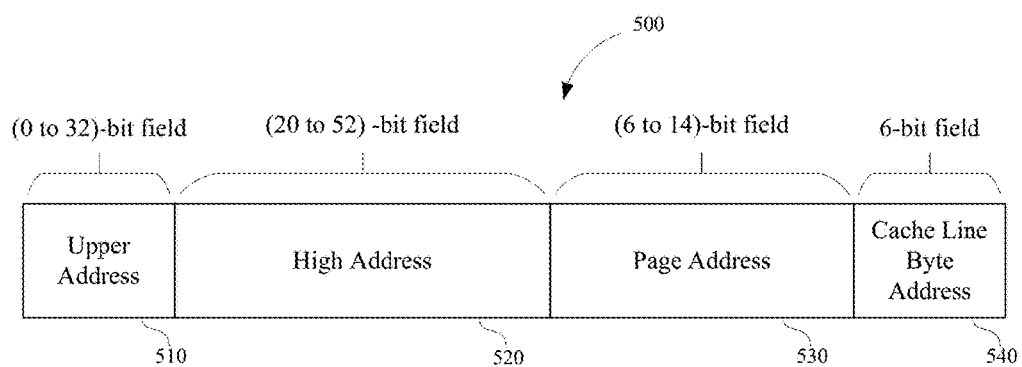
FIG. 5 is a block diagram showing the segmentation of a processor address, according to one aspect of the present disclosure.

Address Fields:

FIG. 5 shows an example 500 of address bit fields 500, according to one aspect of the present disclosure. It is not intended to be exhaustive or to limit the various adaptive aspects disclosed herein. In the aspect as illustrated, an upper address field 510 comprises upper address bits that are not supported by the system as the processor may address more physical location than are populated in the system or the virtual address size might exceed the physical address size. In one aspect, the cryptographic algorithm does not to apply the cryptographic key to these upper bits as it may cause memory requests to addresses that are not supported by the system causing memory fault errors.

In one aspect, the high address field 520 is separated from the other address fields to apply a separate cryptographic key to this field than to a page address field 530. In one embedment, these two fields are separated to increase the cryptographic strength. The cache line byte address field 540 includes the address bits that address the information byte within a cache line. In one aspect, the cryptographic algorithm does not to apply the cryptographic key to these cache line byte address bits as it may cause errors or performance issues in cache functionality.

Figure 6:
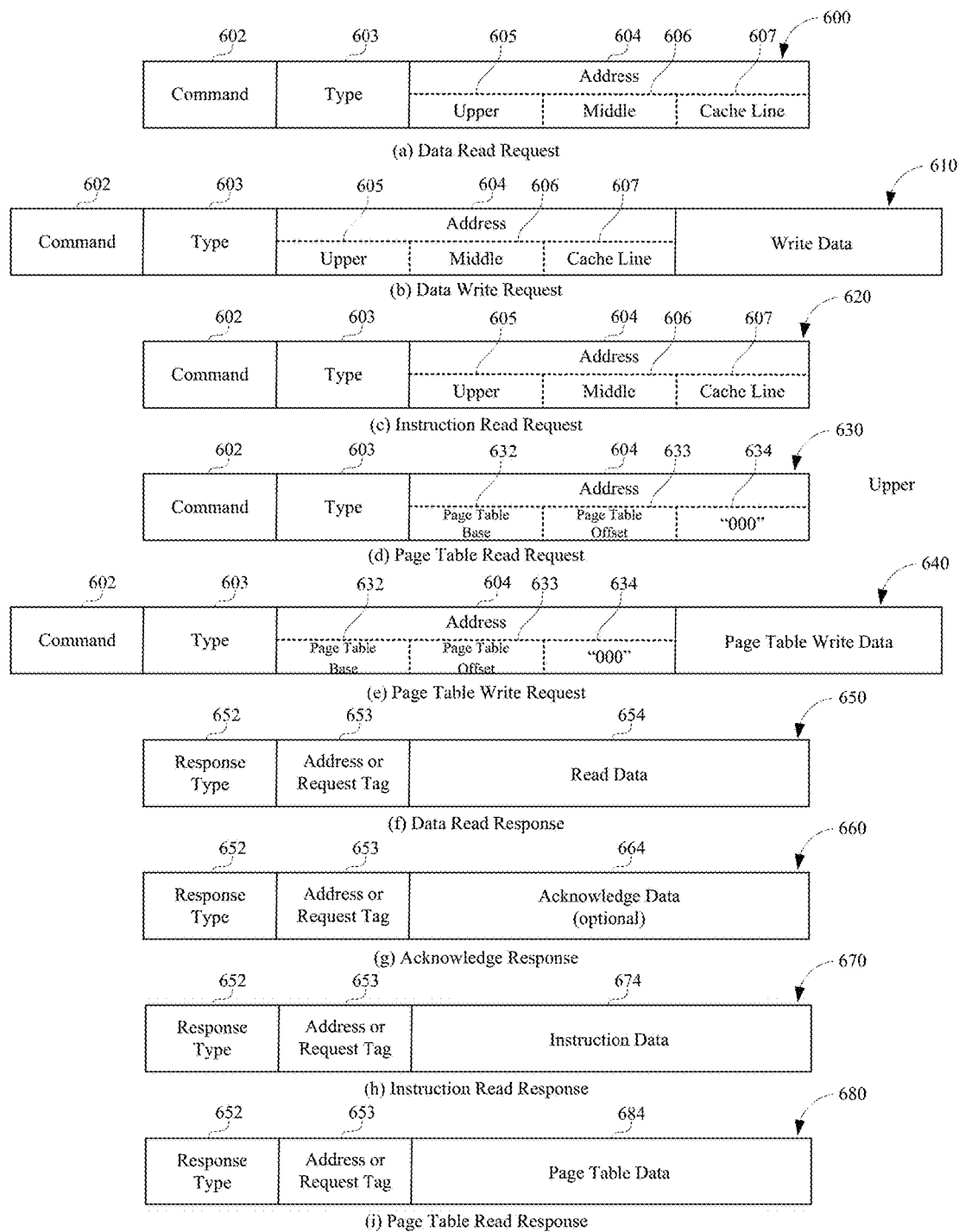
FIG. 6 is a block diagram showing information transfer, according to one aspect of the present disclosure.

Information Messages:

FIG. 6 is a conceptual illustration of aspects discussed herein depicting information 205 and cryptographically protected information 480, for example, request 600, 610, 620, 630, 640 and response 650, 660, 670, 680 information according to one aspect of the present disclosure. It is not intended to be exhaustive or to limit the various adaptive aspects disclosed herein. The command 602 and type 603 fields differentiate between the different requests. The response type 652 and address or request tag 653 fields are used to differentiate between different responses.

Data read request 600 is composed of command 602, type 603 and address 604 fields. The address 604 is further segmented into upper 605, middle 606, and cache line 607 fields. In one aspect, the different fields of address 604 receive unique cryptographic processing based on command 602 and type 603 fields. Data write request 610 is composed of command 602, type 603, address 604, and write data 612 fields. The address 604 is further segmented into upper 605, middle 606 and cache line 607 fields. Instruction read request 620 is composed of command 602, type 603 and address 604 fields. The address 604 is further segmented into upper 605, middle 606, and cache line 607 fields.

Page table read request 630 is composed of command 602, type 603 and address 604 fields. The address 604 is further segmented into page table base 632, page table offset 633, and zeros 634 fields. The page table base 632 field defines the memory location of the page table(s). The page table offset defines the entry offset into the page table. The lower memory address bits of the zero 634 field indicate address alignment of the page table entries. The optional alignment for example may be word, double word, or cache line. The page table example is a simplified view of page table construction used for illustrative purposes. Modern page table structures will have multiple levels of indirection with response fields to indicate the table level. These table level identifier are included in the page table data 642 and 684.

Page table write 640 is composed of command 602, type 603, address 604 and page table write data 642 fields. The address 604 is further segmented into page table base 632, page table offset 633 and zeros 634 fields. The page table base 632 field defines the memory location of the page table(s). The page table offset defines the entry offset into the page table. The lower memory address bits of the zero 634 field indicate address alignment of the page table entries. The page table write data 642 is the page table entry value used to update the page table. In one aspect, a controller 102A-102N may have multiple multi-level page tables used to translate virtual to physical addresses and provide memory access protection control.

In one aspect, a mask is applied in the cryptographic processing of page table data to prevent the modification of upper address bits as it may cause memory requests addresses that are not supported by the system causing memory fault errors. In one aspect, the effect is to not apply the cryptographic key to page table data.

Data read response 650 is composed of response type 652, address or request tag 653, and read data 654 fields. The address or request tag 653 is assigned to the request and is delivered back with the response information to allow the requestor to match the response to the request when multiple requests are simultaneously outstanding and allowed to be returned out-of-order or when errors are to be associated to a request. The read data 654 field is the value returned from a memory read operation. Acknowledge response 660 is composed of response type 652, address or request tag 653, and optional acknowledge data 664 fields. The optional acknowledge data 664 field is the optional value that may be returned from an acknowledge request operation. Instruction read response 670 is composed of response type 652, address or request tag 653 and instruction data 674 fields.

Page table read response 680 is composed of response type 652, address or request tag 653, and page table data 684 fields. The page table data 654 field is the value returned from a memory read operation of the page table.

A complete list of information message types is likely to be significantly larger including cache coherence protocol, input and output, maintenance, control, atomic operations and other special information messages. Additional information message fields would also likely be provided such as error detection and correction codes, parity, strobes, commands and flow control mechanisms.

Figure 7:
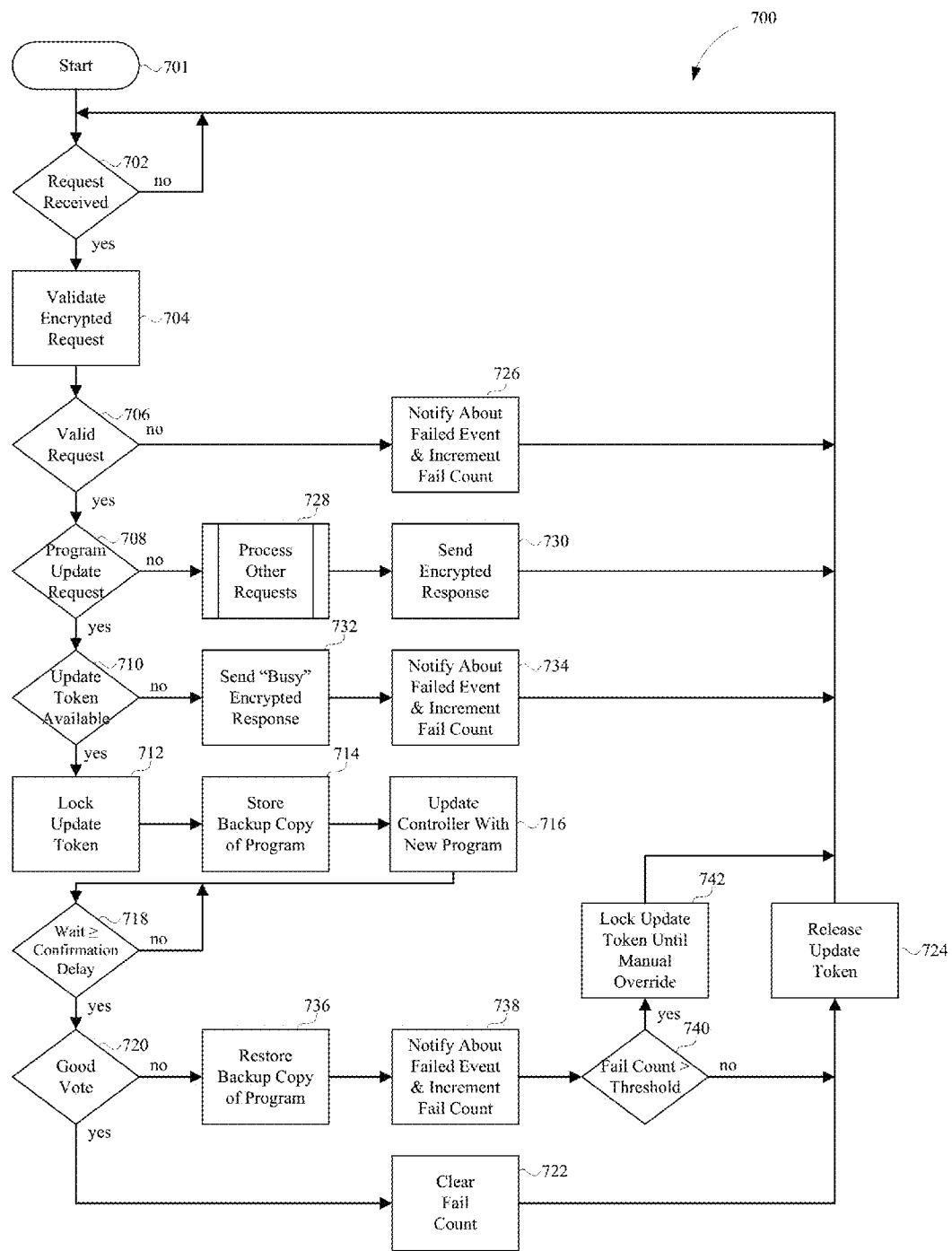
FIG. 7 shows a flow diagram illustrating request processing in an encrypted system, according to the various aspects as described herein.

Process Flows:

FIG. 7 shows a process flow 700 for processing system level commands, according to one aspect of the present disclosure. The process 700 starts at block 701. At block 702, the process determines whether or not a system command (request) is received. If not, the process waits and rechecks. This may be determined by the reception of a network packet across network interface 122 from control device 170. Block 702 may involve a periodic check or a listener that waits until a request is received and then wakes up.

At block 704, the programmable controller or computer 102A-102N validates the encrypted request. If the request is determined to be valid at block 706, then the process continues to block 708, where it is determined if the request is for a program update. If the request is not valid, at block 726 the programmable controller or computer 102A-102N notes that the request is a failure and a fail counter (not shown) may be incremented and/or other notifications may be generated before the process returns to block 702 to await another request.

At block 708, if the request is not a program update, the process continues to block 728 where other requests are processed and an encrypted response is sent at block 730. On the other hand, if the request is for a program update, at block 710, the programmable controller determines whether or not there is an update token available. When no token is available, the process continues to block 732 where a "busy" encrypted response is sent. At block 734, the request is a failure, and a fail counter may be incremented and/or other notifications may be generated before the process returns to block 702 to await another request.

If a token is available, an update token is locked at block 712. In one aspect, the process continues to block 714 where a back-up copy of the program to be updated is stored. In one aspect, for example, program store A 136 or program store B 138 may accept the back-up copy, depending on which program store is currently the active store and which is the back-up.

At block 716, the programmable controller updates its active program store with the new program. The programmable controller then waits for a period of time at block 718; then at block 720, it is determined whether or not the update is good. If it is, the fail count may be cleared at 722, the update token is released at block 724, and the process returns to 702 to await another request.

If the vote indicates that the update is not acceptable, the process instead continues to block 736 where the back-up copy of the program is restored. At block 738, the request is deemed a failure, and a fail counter may be incremented and/or other notifications may be generated before the process returns to block 702 to await another request. If the fail count is greater than a threshold value, at block 740, the update token may be locked until a manual override at block 742. However, if the fail count is less than or equal to the threshold, the update token is simply released and the process continues to block 702 to await additional requests. In one aspect, the fail count threshold is a value of zero.

FIG. 8 shows a process 800 for cryptographic key error correction processing, according to one aspect of the present disclosure. The illustrated process 800 begins at block 802. At block 804, majority key selection and state machine 320 determines whether there is a new key, new key word, or other part of a new key is output. If not, the process simply waits for a new key output to be detected.

When there is a new key output detected, the process continues to block 806. At block 806, the majority key selection and state machine 320 determines whether or not the key in key storage A 310A is the same or similar bit for bit to the majority key output. If so, majority key selection and state machine 320 continues with the next key storage B 310B at block 808. If not, majority key selection and state machine 320 causes the majority key to be rewritten to key storage A 310A before proceeding to the next key in key storage B. The check of block 808 and optional rewrite of block 814 are similar to blocks 806 and 812 except with a different input and storage area. As can be seen from the process, it will continue for each key A-N and corresponding key storage A-N 310A-N. In various aspects, each check can be performed in any order, simultaneously or sequentially, in whole or in part.

Figure 9:
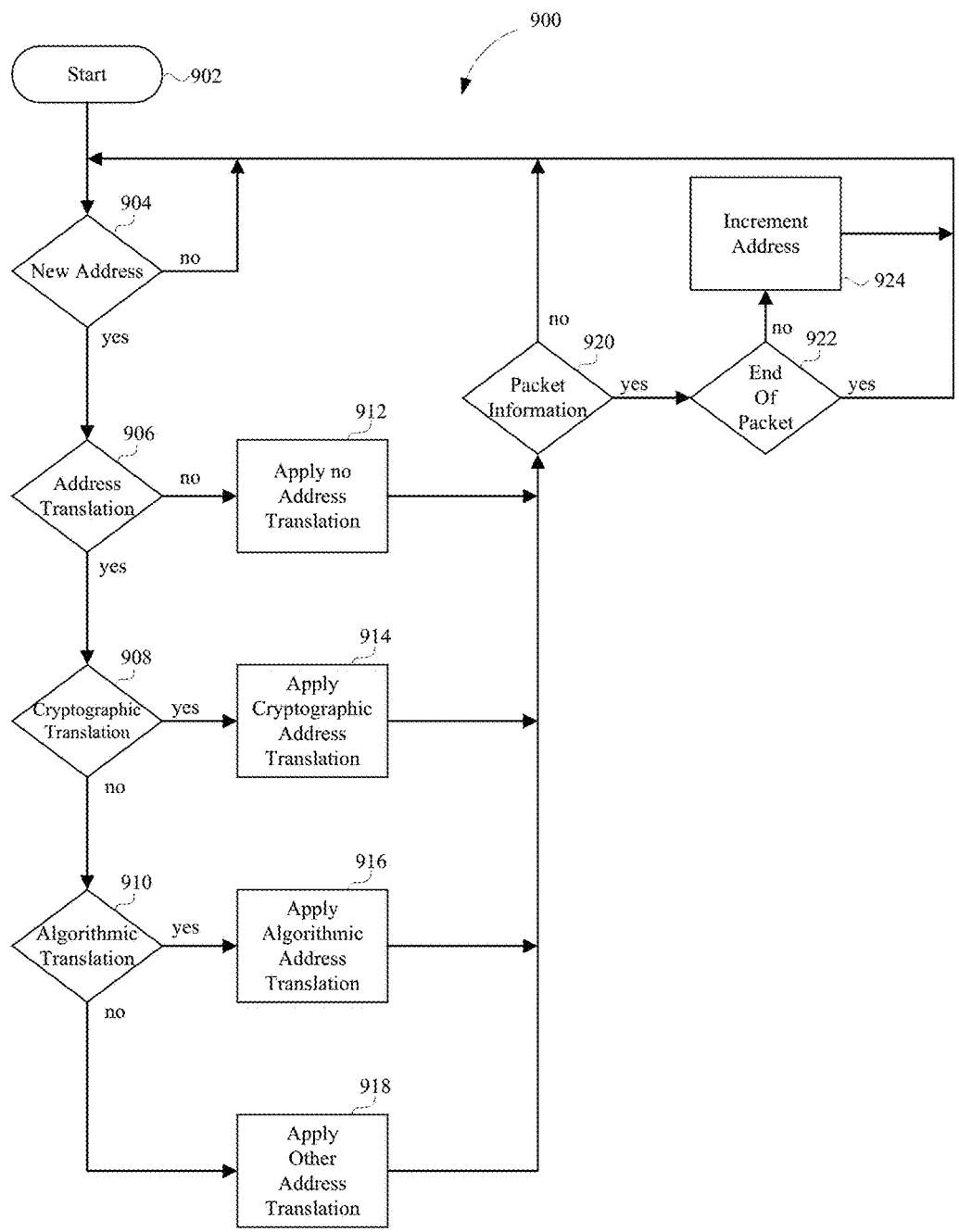
FIG. 9 shows a flow diagram of information address translations, according to the various aspects as described herein.

FIG. 9 shows flow diagram 900 for address translation state machine processing, according to one aspect of the present disclosure. As set forth above, in one aspect, address translation state machine 415 may perform the process 900 for address translation. In one aspect, process 900 starts at block 902, and at block 904, the address translation state machine 415 determines whether it has received a new address. If not, it waits until it has. When it has, the address translation state machine 415 determines at block 906 whether address translation is required. If not, the process continues to block 912 where no translation is applied and the process proceeds to block 920. If there is to be address translation, the process continues to block 908 where the address translation state machine 415 determines if there is cryptographic translation required. If so, cryptographic translation is applied at block 914 and the process continues to block 920. If no cryptographic translation is to be performed, the process checks for algorithmic translation at block 910. If algorithmic translation is to be performed, the address translation state machine 415 applies algorithmic translation at block 916. If not, other translation may occur at block 918.

In any case, the process as illustrated continues to check whether there is packet information to be cryptographically processed at block 920. The address translation algorithm can take many forms such a truncation, addition, or subtraction of a constant; multiplication or division by a constant; factorization; Taylor Series; remainder arithmetic; Boolean algebra; Hash functions; scrambling; substitution; table driven mapping; LFSR sequencing; cipher feedback; random correlation; error detection and correction schemes; prime number indexing; or a logarithmic, trigonometric, physical to virtual, virtual to physical, or any other arithmetic function or operation that produces repeatable results. When the information to be cryptographically process is a data packet typically only a starting address is provided. There is not an address provided for each word of the data packet and an incrementing address needs to be computed for each data word of the data packet. If not the process returns to block 904. If so, the process checks for an end of packet at block 922. If not, the address is incremented at block 924 and the address is returned to block 904. If the end of packet has been reached, the process returns to block 904.

Figure 10:
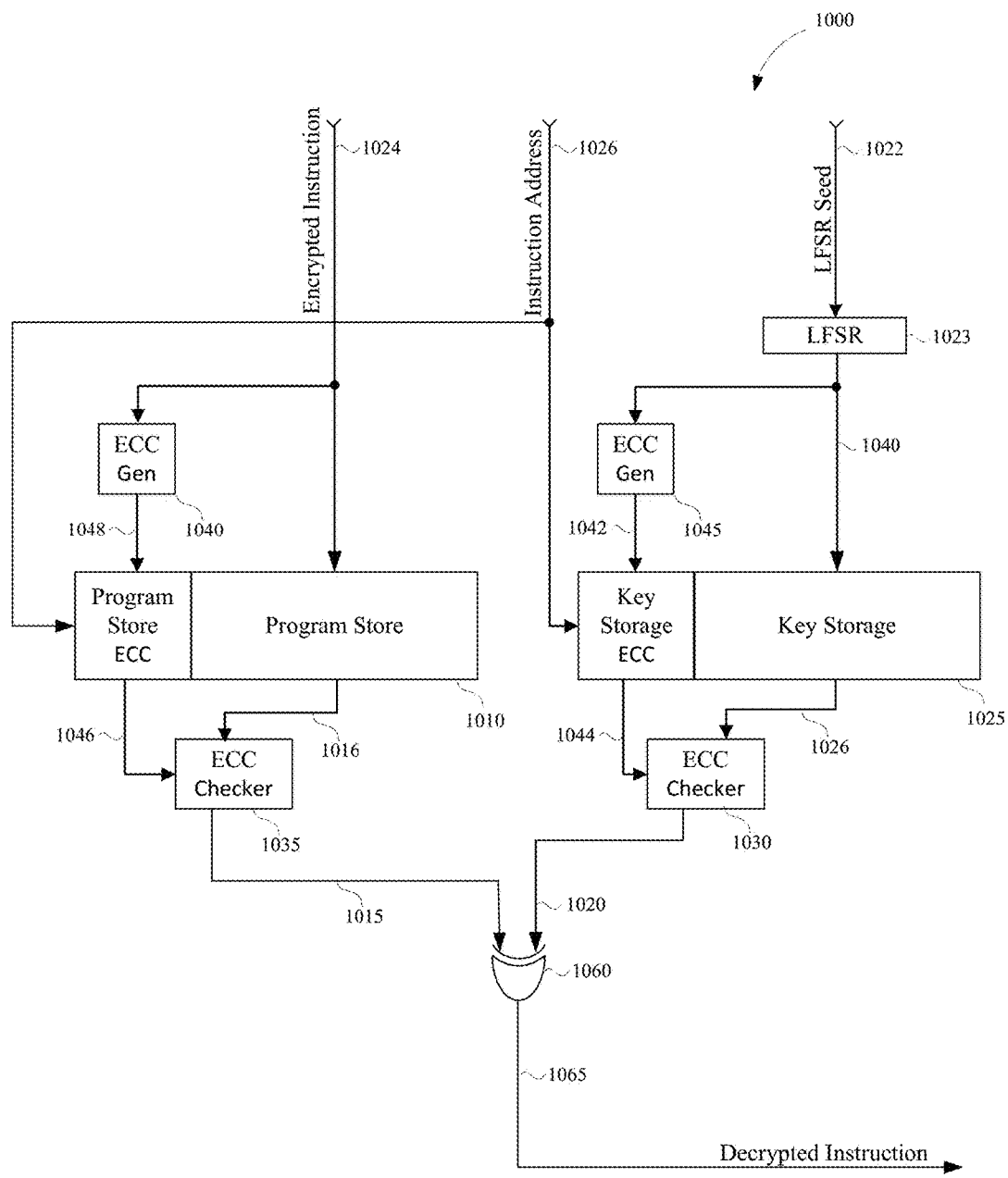
FIG. 10 is a block diagram of illustrating a program store cryptographic processing system, according to one aspect of the present disclosure.

FIG. 10 is a conceptual illustration of aspects discussed herein depicting program store 1010, key storage 1025 and cryptographic processing 1060 in the same memory system 1000 as a replacement for a cryptographically protected CPU (for example, 240, FIG. 2). It is not intended to be exhaustive or to limit the various adaptive aspects disclosed herein. Encrypted instructions 1024 are load and stored in program store 1010. During the storage loading process an Error Correction Code (ECC) 1048 is generated for each encrypted instruction word 1024 by ECC generator 1040 and is written into program store 1010 along with the encrypted instruction 1024. The instruction address 1026 selects the memory location to be read from or written into for both the program store 1010 and key storage 1025. The key storage 1025 is loaded in a similar method except that the cryptographic key data 1040 is optionally generated by the Linear Feedback Shift Register (LFSR) 1023 using seed 1022. ECC generator 1045 is used to generate ECC 1042 for each of the cryptographic key data word 1040. The resulting ECC 1042 is stored along with the cryptographic key data 1040 in key storage 1025.

When instructions are read for program execution the instruction address 1026 address both the program store 1010 and key storage 1025 selecting a word from each storage device or location. When program store 1010 is read an encrypted program instruction word 1016 along with the corresponding ECC 1046 is presented to the ECC checker 1035. The ECC checker 1035 will take this information and detect and correct errors in the read encrypted instruction word 1016, if they exist, outputting a corrected encrypted instruction word 1015. Similarly ECC checker 1030 inputs the key ECC 1044 and Key data 1026 to output a corrected cryptographic key word 1020. The corrected encrypted program instruction data 1015 and the corrected cryptographic key 1020 are cryptographically processed by device 1060 to product a decrypted instruction word 1065 for execution. This read process is repeated for each read address selected by instruction address 1026.

In one aspect, the program store 1010 and key storage 1025 are the same device.

The various aspects described above may be implemented using circuitry and/or software modules that interact to provide particular results. One of skill in the computing arts can readily implement such described functionality, either at a modular level or as a whole, using knowledge generally known in the art. For aspect, the flowcharts illustrated herein may be used to create computer-readable instructions/code for execution by a processor. Such instructions may be stored on a non-transitory computer-readable medium and transferred to the processor for execution as is known in the art.

The foregoing descriptions of the aspects have been presented for the purposes of illustration and description. It is not intended to be exhaustive or to limit the inventive concepts to the precise form disclosed. Many modifications and variations are possible in light of the above teaching. Any or all features of the disclosed aspects can be applied individually or in any combination and are not meant to be limiting, but purely illustrative. It is intended that the scope be limited not with this detailed description, but rather determined by the claims appended hereto.

What is claimed is:

1. An apparatus comprising:
   an input interface adapted to receive input from a device;
   a processor connected to the input interface;
   a cryptographic module coupled between the processor and a memory device storing encrypted program instructions for the processor, the cryptographic module cryptographically protecting the processor by performing cryptographic processing of the encrypted program instructions before any program instructions are provided to the processor for execution;
   a program store control connected to the processor, the program store control controlling use of and access to at least two program stores at the memory device, wherein at least one program store acts as a primary program store for storing the encrypted program instructions and at least one program store acts as a back-up program store for storing the encrypted program instructions; and an output interface connected to the processor for outputting at least one of commands or data;
wherein the processor is programmed to:
receive and validate a request;
determine that a valid request is a program update request for a first program that is encrypted and stored at the memory device;
initiate a lock mechanism into a locked state, where the lock mechanism operates in an unlocked state, the locked state to complete the program update request, a wait state to confirm a successful update and a state defined by when a number of update failures has reached a threshold value and the lock mechanism is unlocked by an override code; and wherein within the locked state:
back-up the first program at one of the program stores;
update the first program at another of the program stores; and
check that the update is valid before releasing the lock mechanism into the unlocked state.

2. The apparatus of claim 1, wherein the processor is further programmed to restore the back-up program store when the update is not validated.

3. The apparatus of claim 2, wherein the program store control restores the back-up program by changing at least one program store acting as a back-up to acting as a primary program store and changing at least one program store acting as a primary program store to acting as a back-up program store.

4. The apparatus of claim 1, wherein the processor is further programmed to determine whether an update token is available and use the update token, when available, to initiate the lock mechanism.

5. The apparatus of claim 4, wherein the processor is further programmed to send a busy response to the request when the update token in unavailable to update the first program.

6. The apparatus of claim 1, further comprising a fail counter such that the fail counter is incremented when the request cannot be completed to update the first program.

7. The apparatus of claim 6, wherein the lock mechanism uses a manually entered override code to reach the unlocked state, when the fail counter has reached the threshold value.

8. A cryptographic processing device comprising:
a processing unit in which all input and output is processed by at least one cryptographic processing module before the processing unit; wherein the at least one cryptographic processing module cryptographically protects the processing unit by performing cryptographic processing of all the input and output of the processing unit;
a memory management unit communicating with the processing unit through the at least one cryptographic processing module, the memory management unit accessing a program storage memory storing encrypted programs;
wherein the processing unit is programmed to:
receive a request through the at least one cryptographic processing module;
validate the request;
when the request is valid, process non-update requests; and
when the request is valid and the request is an update request to update an encrypted program:
set an update token provided by a lock mechanism to a locked state; wherein the lock mechanism operates in an unlocked state, the locked state to complete the update request, a wait state to confirm a successful update and a state defined by when a number of update failures has reached a threshold value and the lock mechanism is unlocked by an override code;
backup the encrypted program to be updated based on the update request;
update the encrypted program based on the update request;
check confirmation of the back-up; and
return the update token to an unlocked state.

9. The cryptographic processing device of claim 8, wherein the request is decrypted by the at least one cryptographic processing module before being processed by the processing unit.

10. The cryptographic processing device of claim 9, wherein the processing unit is further programmed to generate a response to the request and wherein the response is encrypted by the at least one cryptographic processing unit.

11. The cryptographic processing device of claim 8, wherein the device stores and utilizes multiple key sets for use by the at least one cryptographic processing module.

12. The cryptographic processing device of claim 11, wherein the device stores multiple copies of each key set and compares a key from the multiple copies of one of the multiple key sets to error check the key.

13. A method comprising:
receiving a request for processing by a processor protected by cryptographic processing of a cryptographic module coupled between the processor and to a memory device that stores encrypted program instructions executed by the processor;
decrypting the request at the cryptographic module;
sending the decrypted request to the processor;
attempting to validate the request;
when the request is validated, determining, by the processor, whether the request is a program update request for a first encrypted program and stored in the memory device;
when the request is a program update request, initiating a lock mechanism to a locked state, where the lock mechanism operates in an unlocked state, the locked state to complete the program update request, a wait state to confirm a successful update and a state defined by when a number of update failures has reached a threshold value and the lock mechanism is unlocked by an override code; and wherein within the locked state:
backing-up the first encrypted program at a program store;
updating the first encrypted program at a second program store;
checking that the program update is valid;
making the second program store a primary program store when the program update is validated; and
releasing the lock mechanism to the unlocked state.

14. The method of claim 13, further comprising restoring, within the locked state, the back-up program store when the program update is not validated.

15. The method of claim 14, wherein restoring the back-up program comprises making the first program store the primary program store; and making the second program store a back-up program store.

16. The method of claim 13, further comprising determining whether an update token is available; and using the update token, when available, to initiate the lock mechanism.

17. The method of claim 16, wherein the processor is further programmed to send a busy response to the request when the update token in unavailable to update the first program.

18. The method of claim 16, further comprising updating a fail counter in any of the following conditions: when the request cannot be validated, when the update token is unavailable, or when the program update cannot be validated.

19. The method of claim 18, further comprising resetting the fail counter when the program update is validated.

20. The method of claim 18, further comprising requiring a manual entered override code to reach the unlocked state when the fail counter has reached the threshold value.

\* \* \* \* \*